United States Patent
Murphy et al.

(10) Patent No.: US 7,395,324 B1
(45) Date of Patent: Jul. 1, 2008

(54) METHOD AND APPARATUS FOR MAINTAINING A COMPUTER SYSTEM

(75) Inventors: Robert Murphy, Phoenix, AZ (US); Andrew Woodward, Tempe, AZ (US)

(73) Assignee: WNF Consulting, Phoenix, AZ (US)

( * ) Notice: Subject to any disclaimer, the term of this patent is extended or adjusted under 35 U.S.C. 154(b) by 697 days.

(21) Appl. No.: 09/606,786

(22) Filed: Jun. 28, 2000

Related U.S. Application Data

(60) Provisional application No. 60/160,120, filed on Oct. 18, 1999, provisional application No. 60/196,186, filed on Apr. 11, 2000.

(51) Int. Cl.
*G06F 15/173* (2006.01)
*G06F 15/177* (2006.01)

(52) U.S. Cl. ................ 709/223; 709/220; 709/221; 709/222; 709/224

(58) Field of Classification Search ............ 709/100, 709/223, 224, 222
See application file for complete search history.

(56) References Cited

U.S. PATENT DOCUMENTS

| | | | |
|---|---|---|---|
| 4,896,289 A * | 1/1990 | Svinicki et al. ............. 714/34 |
| 5,444,850 A * | 8/1995 | Chang .................... 709/222 |
| 5,555,416 A | 9/1996 | Labuda et al. |
| 5,680,547 A * | 10/1997 | Chang .................... 709/222 |
| 5,692,129 A * | 11/1997 | Sonderegger et al. ... 707/103 R |
| 5,768,119 A * | 6/1998 | Havekost et al. ............. 700/4 |
| 5,835,911 A | 11/1998 | Nakagawa et al. |
| 5,919,257 A * | 7/1999 | Trostle .................... 726/22 |
| 6,272,629 B1 * | 8/2001 | Stewart .................... 713/2 |
| 6,314,520 B1 * | 11/2001 | Schell et al. ............... 726/13 |
| 6,477,648 B1 * | 11/2002 | Schell et al. ............... 726/22 |
| 6,609,151 B1 * | 8/2003 | Khanna et al. ............. 709/222 |
| 6,922,722 B1 * | 7/2005 | Mann et al. ................ 709/220 |

FOREIGN PATENT DOCUMENTS

| | | |
|---|---|---|
| EP | 0 703 531 A | 3/1996 |
| EP | 0 811 942 A | 12/1997 |
| EP | 0 841 615 A | 5/1998 |
| WO | WO 96 13002 A | 5/1996 |

OTHER PUBLICATIONS

Anonymous, "Secure Authentication for Remote Client Management", Research Disclosure, vol. 42, No. 419, Mar. 1, 1999, Havant, UK, article No. 41993.

Small, M et al., "Systems Management: An Example of a Successful Client-Server Architecture", Ingenuity, International Computers Limited, GB, vol. 9, No. 1, May 1, 1994, pp. 167-179.

PCT International Search Report, Jun. 27, 2002, PCT/US00/27992, International Filing Date Oct. 10, 2000 for WNF Consulting.

* cited by examiner

*Primary Examiner*—Jason Cardone
*Assistant Examiner*—Azizul Choudhury
(74) *Attorney, Agent, or Firm*—Brett A. Carlson

(57) ABSTRACT

In various embodiments of the invention, a server monitors a network for a startup message from a client computer as appropriate. The server may include a computer application that generates configuration instructions in response to commands from an administrator and/or information obtained from a client computer. The instructions may be in the form of scripts, data, objects, or the like. The instructions may be passed to the client computer, which may execute various administrative functions as directed. In exemplary embodiments, the instructions may command direct placement, verification and/or replacement of files, directory entries, BIOS attributes or other characterisitics of the client computer.

93 Claims, 15 Drawing Sheets

METHOD AND APPARATUS FOR MAINTAINING A COMPUTER SYSTEM

This application claims priority of provisional application Ser. Nos. 60/160,120 and 60/196,186 filed on Oct. 18, 1999 and Apr. 11, 2000, respectively.

FIELD OF THE INVENTION

The invention relates generally to methods and apparatus maintaining computer systems. More particularly, the invention relates to systems for installing and maintaining files, file systems, BIOS data, operating system data and other data on computers in a networked environment.

BACKGROUND OF THE INVENTION

As personal computers (PCs) become increasingly prevalent in home and office environments, computer users and administrators are becoming increasingly concerned about the time, effort and expense required to maintain each computer. Indeed, the lifetime cost of maintaining a computer frequently exceeds the cost of purchasing the computer by at least an order of magnitude or more.

With reference to FIG. 1, a typical computer system 100 includes hardware 102 such as a processor, network interface, a keyboard, a mouse, a monitor and the like. Applications 108 suitably communicate with the hardware to perform various functions through operating system 106. If applications 108 include network functionality, a network interface 104 typically receives network calls from the application 108 via operating system 106 and relays them as appropriate to network hardware included with hardware 108. An exemplary network interface includes the network design interface specification (NDIS) available from the Microsoft™ Corporation of Redmond, Wash., although of course other network interfaces could be used in conjunction with various operating systems and hardware configurations.

As can be appreciated, all aspects of computer system 100 are susceptible to failure, error, or the need for upgrade. Operating system components, for example, may be accidentally modified, moved or deleted by a user. Similarly, network drivers or application programs can become corrupted. Accordingly, an ideal administration program would be able to perform administrative tasks, repairs and upgrades on all aspects of the computer system 100. Such functionality typically requires, however, that the administrative tool operates even if the network layer 104, operating system 106 or application layer 108 is not available.

Although various administration tools have existed in the past, these tools have exhibited one or more marked disadvantages. The Intellimirror™ product available from the Microsoft Corporation of Redmond, Wash., for example, operates at the application level 108. Similarly, the Norton Utilities™ and Norton Ghost™ programs available from the Symantec Corporation of Cupertino, Calif. operate at application level 108. Because these programs operate at the application level, their proper execution requires that hardware 102, network layer 104 and operating system 106 be available and functional. If any of these layers 102, 104 or 106 are damaged or otherwise unavailable, the administrative program will not typically function properly.

Conventional administrative programs frequently exhibit further disadvantages in that they typically function on a standalone PC, and as such are not suitable for use in a distributed, networked environment as required by most present day office environments. Distributed administration of networked PCs is desirable because it is frequently cumbersome or inconvenient for support personnel to physically go to the computer to run administrative programs and to execute administrative tasks. Moreover, when an administrator wishes to upgrade or change a particular configuration element on a multitude of PCs, it is often necessary to physically make changes or upgrades on each individual PC. Such a task generally requires a large amount of overhead in terms of time, effort and money.

It is therefore desirable to create a method, system and apparatus to administer, maintain and upgrade computers from a central location. Moreover, it is desirable to maintain and repair these computers even if problems exist with the computer's operating system or network interface.

BRIEF DESCRIPTION OF THE DRAWING FIGURES

The various features and advantages of the present invention are hereinafter described in the following detailed description of illustrative embodiments to be read in conjunction with the accompanying drawing figures, wherein like reference numerals are used to identify the same or similar parts in the similar views, and:

DETAILED DESCRIPTION OF EXEMPLARY EMBODIMENTS

Figure 1:
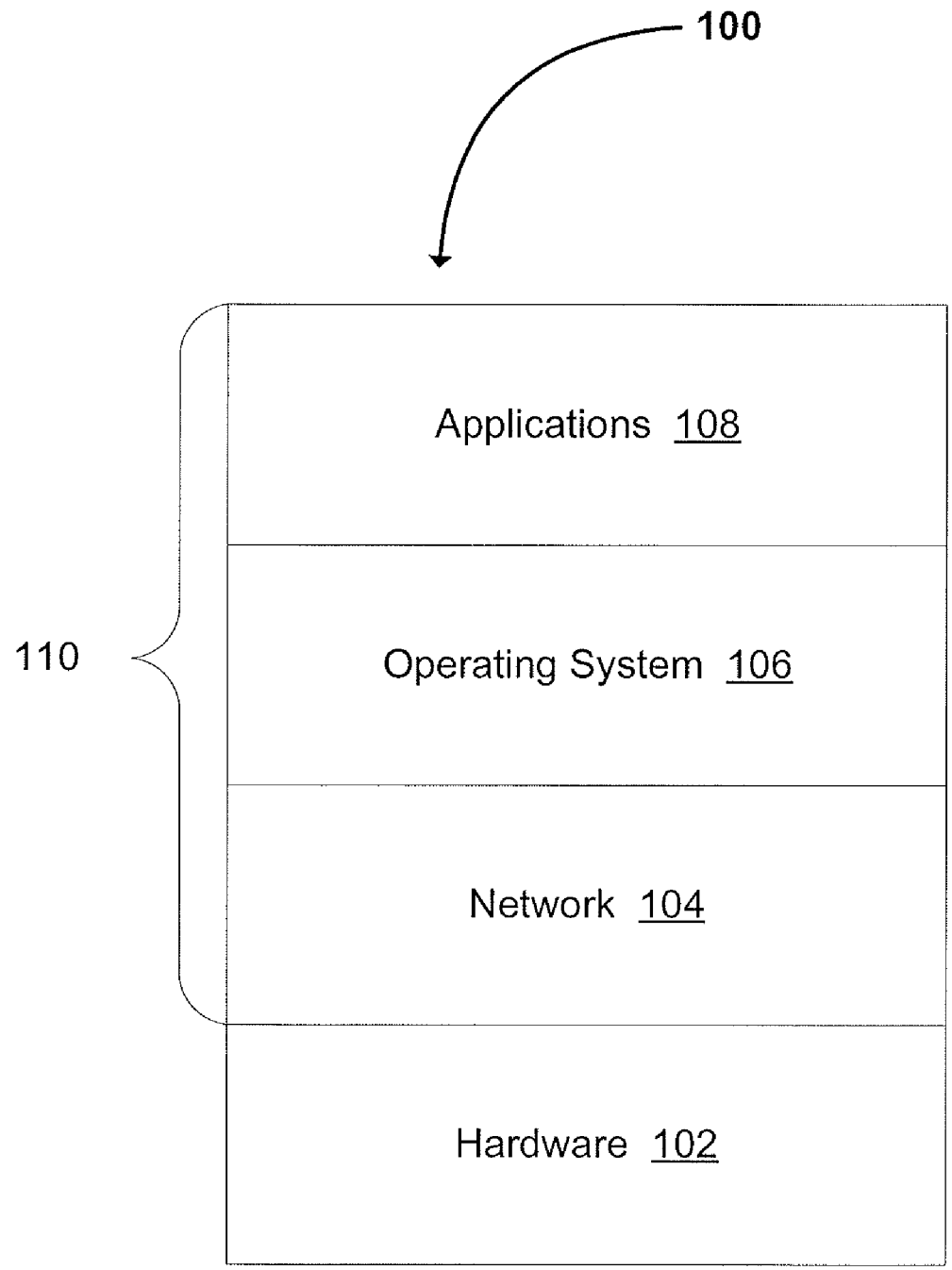
FIG. 1 is a block diagram of a prior art computer system.

The present invention may be described herein in terms of functional block components and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like.

It should be appreciated that the particular implementations shown and described herein are examples of the invention and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical or logical couplings between the various elements. It should be noted that many alternative or additional functional relationships, physical connections or logical connections may be present in a practical computer administration system.

To simplify the description of the exemplary embodiments, the invention is frequently described as pertaining to a system of administering personal computers. It will be appreciated, however, that many applications of the present invention could be formulated. For example, the present invention could be used to administer, upgrade, monitor, configure or control any type of computer running any operating system such as any version of Windows™, MacOS™, BeOS™, Linux™, UNIX™, or the like. Similarly, the invention could be used in conjunction with any type of personal computer, network computer, workstation, minicomputer, mainframe, or the like. Moreover, although the invention is frequently described herein as being implemented with TCP/IP communications protocols, it will be readily understood that the invention could also be implemented using IPX™, Appletalk™, IP-6, NetBIOS™, OSI or any number of existing or future protocols. Additionally, the PXE pre-boot environment discussed herein could be replaced with any other pre-boot scheme, including any aspect of the Wired for Management™ (WFM) baseline or any other pre-boot sequence. Moreover, the database applications described herein may be implemented with any type of directory services application, relational database, object-oriented database, hierarchical database, data structure or the like, as described more fully below.

Overview of an Exemplary Remote Management/Configuration System

Figure 2:
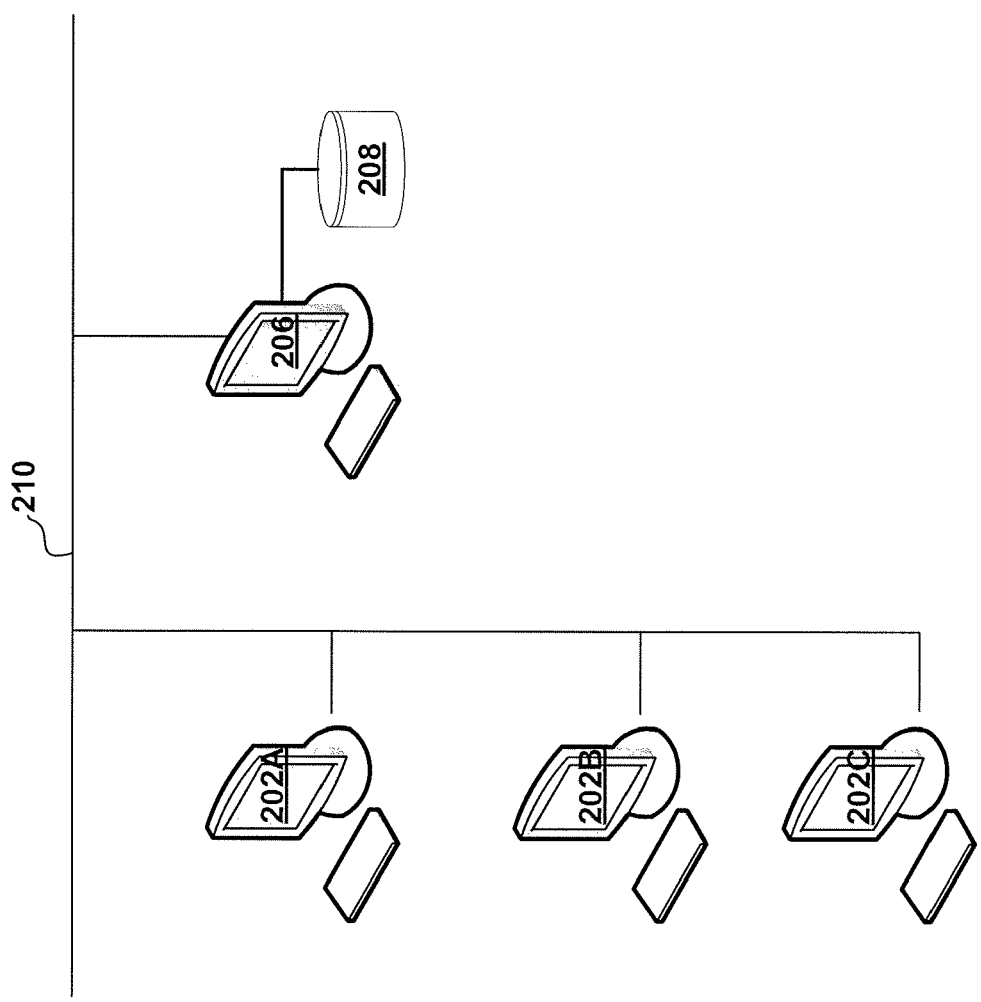
FIG. 2 is a schematic of an exemplary client-server network architecture.

With reference to FIG. 2, an exemplary management and configuration system 200 suitably includes one or more client computers 202 (also referred to herein as simply "clients", examples of which are shown as 202A, 202B and 202C in FIG. 2) communicating via a network 210 with a server 206. As each client computer 202 is booted by a user or via the network, the client computer 202 may contact the server 206 to obtain configuration information. As server 206 receives requests for information, server 206 may query a database 208 to determine whether database 208 includes a record corresponding to the particular client computer 202 requesting services. Database 208 may be any sort of database application such as a directory services application, a relational database, or the like. If server 206 recognizes client computer 202 (e.g. if an entry exists in database 208), server 206 may send scripts or other configuration instructions to client computer 202 based upon events (such as calendar based or sequential events). If server 206 does not recognize client 202 (for example, if client 202 is being connected to network 210 for the first time), server 206 may obtain information about the client computer 202 relating to the type of computer, hardware configuration, memory attributes, basic input/output system (BIOS), and/or other information about client computer 202. This information may be provided to an application running on server 206, for example, that may provide a script or other program that may be configured for the particular attributes of client 202. The script or program may also execute various administrative tasks relating to the client computer 202, as required and appropriate. Exemplary administrative tasks that may be carried out by scripts provided by server 206 to client 202 include, for example: booting the operating system directly from server 206; another server or a local drive; checking the integrity of the operating system, files, BIOS or other attributes of client 202; repairing or replacing the contents of the hard drive of client computer 202 with an image stored on server 206 or elsewhere; repairing or replacing files, directory entries, BIOS attributes and the like; and/or performing various other administrative or management tasks. After configuration is complete, server 206 may send a "chainboot" command to client computer 202 to instruct client computer 202 to boot its local operating system. Server 206 may thusly maintain the operating system 106, application layers 108 and other attributes of each client computer 202 from a central location on network 210.

Exemplary Configurations

With continued reference to FIG. 2, client computers 202 may be any type of computer system (or combination of computer system types) that are to be remotely managed. In various embodiments, client computers 202 include memory, a processor and a hard drive (not shown in FIG. 2). Each hard drive may include an individually-bootable operating system such as Windows 95, Windows 2000™ Windows NT™, any other version of Windows™, Linux™, UNIX™, MacOS™ or the like. Alternatively, one or more client computers 202 may be configured as "network computers" that obtain their operating system from a network server 206, or another server not shown in FIG. 2. Each client computer 202 is coupled to data network 210 via any appropriate device or technique. In an exemplary embodiment, client computers 202 include network interface cards (NICs) that facilitate communications between client computer 202 and various network hosts. Such NICs may include media access control (MAC) addresses stored in hardware, software or firmware that uniquely identify the particular NIC. Such MAC addresses may be assigned and configured by NIC manufacturers such as the 3Com™ corporation, the Intel™ Corporation and others. In various embodiments, each NIC also includes remote boot functionality in hardware, software or firmware as described below. An example of remote boot functionality is the pre-boot execution environment (PXE)™ formulated by the Intel Corporation of Santa Clara, Calif. and described in "Pre-boot Execution Environment (PXE) Specification Version 2.0" dated Dec. 28, 1998, which is incorporated herein in its entirety by reference.

Network 210 may be any device or technique capable of transmitting data between computers such as clients 202 and server 206. In various embodiments, network 210 is an Ethernet™, token ring or fiber optic network, although it will be appreciated that any suitable cabling, networking, or data transmission technique (such as any form of wireless networking) could be used.

Server computer 206 (also referred to simply as a "server") may be any computer or data processing system that is used to administer the files, data and/or usage of client computers 202. In various embodiments, server 206 is a personal computer or workstation running, for example, the LINUX™. UNIX™, Windows NT™, Windows 2000™ or any other operating system. In other embodiments, server 206 is a personal computer configured as a network server using, for example, Netware Server™ version 4.0 (or greater) software available from the Novell™ corporation of Provo, Utah.

Server 206 may maintain a database 208 of characteristics relating to client computers 202, as appropriate. Database 208 may be implemented with any hierarchical or relational database, registry or directory services product that is capable of storing workstation attributes. Examples of products that could be used to implement database 208 include the Netware Directory Services™ (NDS) directory available from the Novell corporation of Provo, Utah, or the Microsoft Active Directory™ available from the Microsoft Corporation of Redmond, Wash. Various standards relating to storing information in directory services include X.500, the lightweight directory access protocol (LDAP), the directory access protocol (DAP), NDS and AD. Other embodiments may incorporate database software available from, for example, Netscape™, Sybase™, Oracle™, IBM™ or Microsoft™. As used herein, the term "database" refers to any database, database management, directory services or similar application.

Database 208 suitably maintains a database of attributes, characteristics, requirements or the like affiliated with client computers 202 that is indexed by, for example, the MAC address of the NIC associated with each particular client computer 202. Server 206 may also maintain various administrative applications (not shown) in memory or stored on a storage device such as a hard disk. In various embodiments, the administrative applications allow network managers to configure scripts and images that are stored on server 206 or elsewhere, as appropriate. These scripts and images are suitably provided to client computers 202 as described below (e.g. in conjunction with FIGS. 8-9) to assist in configuring and managing the various clients. It will be understood that the functionality of server 206 may be spread across several physical machines or partitions of a particular machine without departing from the ambit of the invention. It will be further understood that database 208 may be replicated across various servers to facilitate travelling or roaming users, for example.

An Exemplary Server Application

Figure 3:
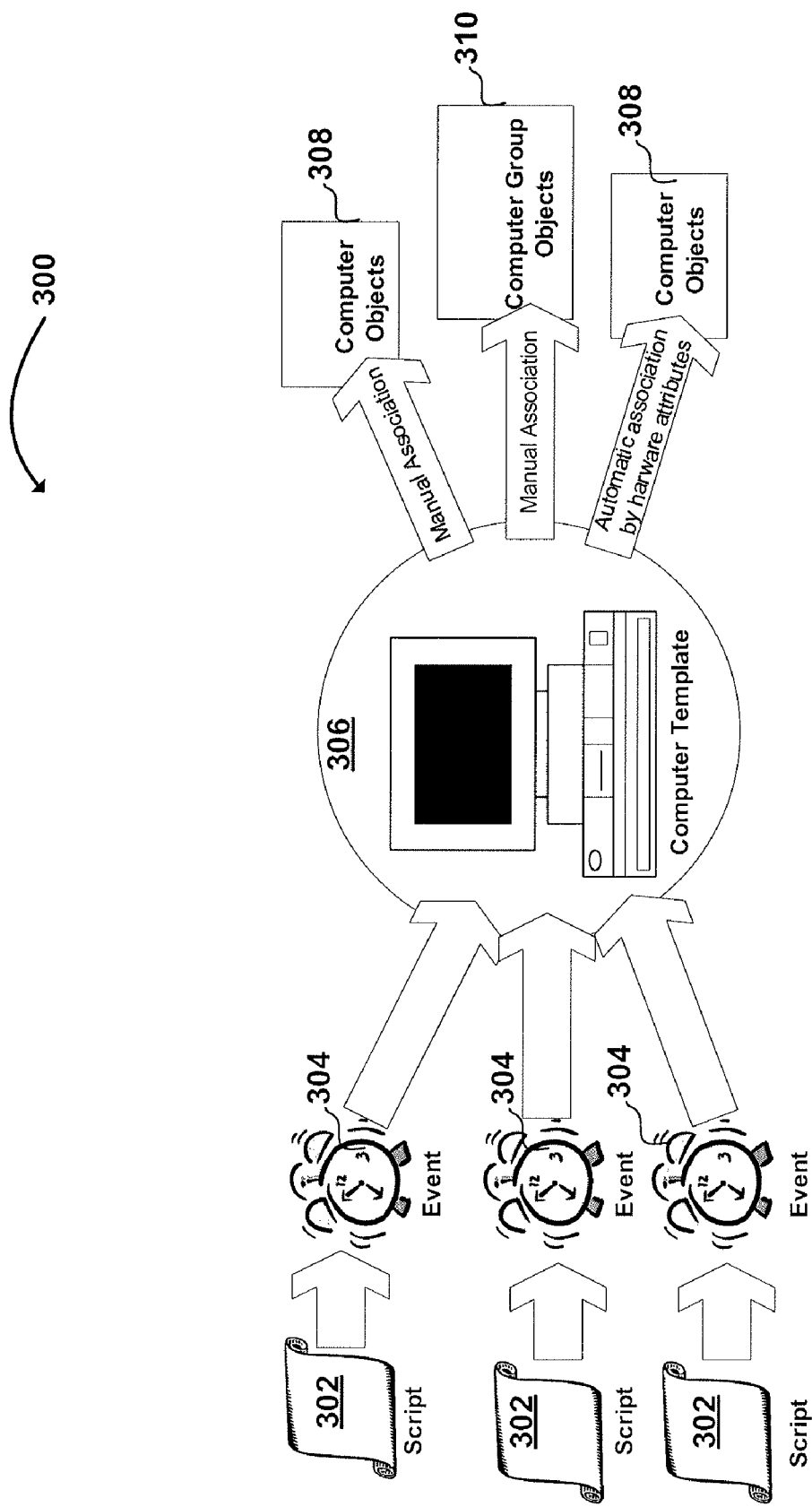
FIG. 3 is a block diagram of an exemplary server application.
Figure 8:
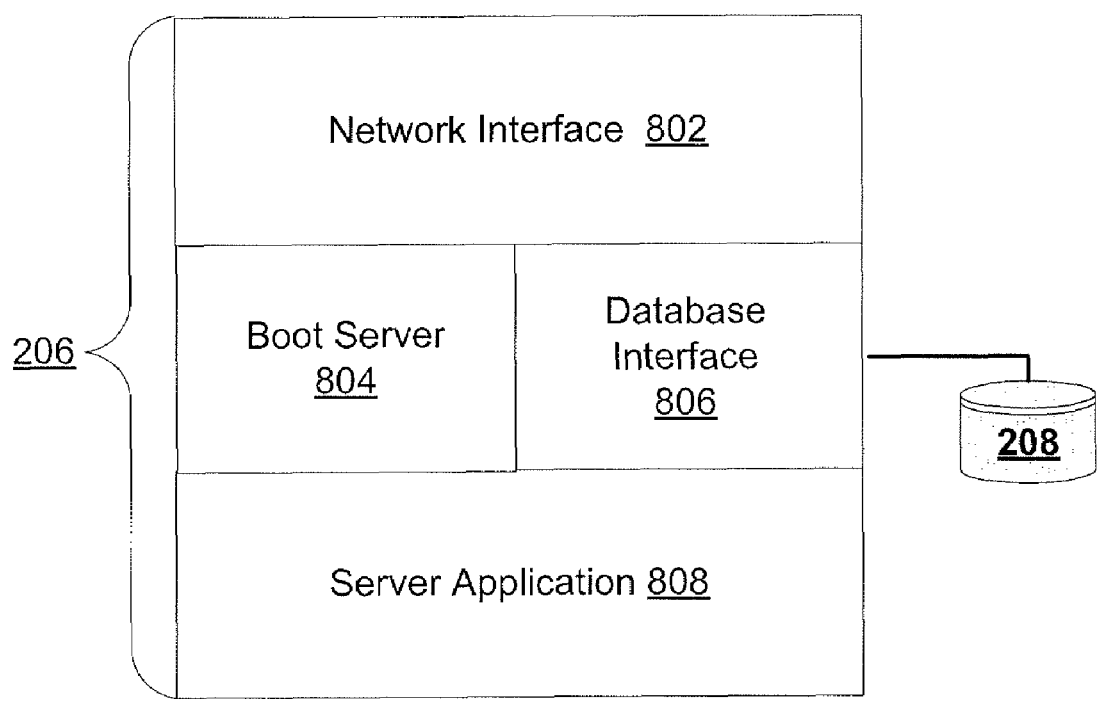
FIG. 8 is a block diagram of an exemplary server application.

With reference now to FIGS. 3, 8 and 9, various embodiments include a software application program 300 running on server 206 that effectively provides a mechanism to automatically configure and manage workstations. Application 300 provides scripts, data and/or instructions to the various client computers 202 as appropriate, and may be event driven, object oriented, and/or directory enabled, as appropriate.

With reference to FIG. 8, an exemplary server 206 suitably includes a network interface 802 to network 210 (FIG. 2), an optional boot server 804, a database interface 806 in communication with database 208, and a server application 300. Optional boot server 804 may be a daemon or other program that "listens" for boot requests transmitted on network 210 and received at network interface 802. An exemplary boot request may be a PXE request transmitted by a client computer 202 when client 202 is powered up. When a request is received at server 206, database so interface 806 suitably matches a network address (such as a MAC address) of the client computer 202 requesting the connection to an entry in database 208. The entry in database 208 may be, for example, a unique attribute of a record in database 208 or an object in a directory services application. If no entry is present, server application 300 may create a new entry for the client 202. If an entry is present, server application 300 may retrieve a script from database 208 via database interface 806 as described below.

Two exemplary embodiments of a server application 300 are discussed herein. In the first embodiment (shown in FIG. 9), various interface windows are provided with configuration options for various client computers 202. The options may be selected by an administrator as appropriate. In the second embodiment (represented by FIGS. 3 and 10), interface windows are provided that allow an administrator to associate scripts with events, which are in turn associated with templates that correspond to particular client computers 202. In various embodiments, the interface windows may be generated as Netware Snap-in™ applications for Novell's Netware Administrator™ programs, or as snap-ins for the Microsoft Management Console™ (MMC) application, for example. It will be understood that the interfaces shown in the various figures are exemplary and that the functionality of server 206 could be implemented with any type of graphical, textual or other form of interface. Further, the embodiments of server application 300 described herein are meant to be illustrative, and of course various elements of the two embodiments may be combined or eliminated as appropriate without departing from the scope of the invention.

Figure 9A:
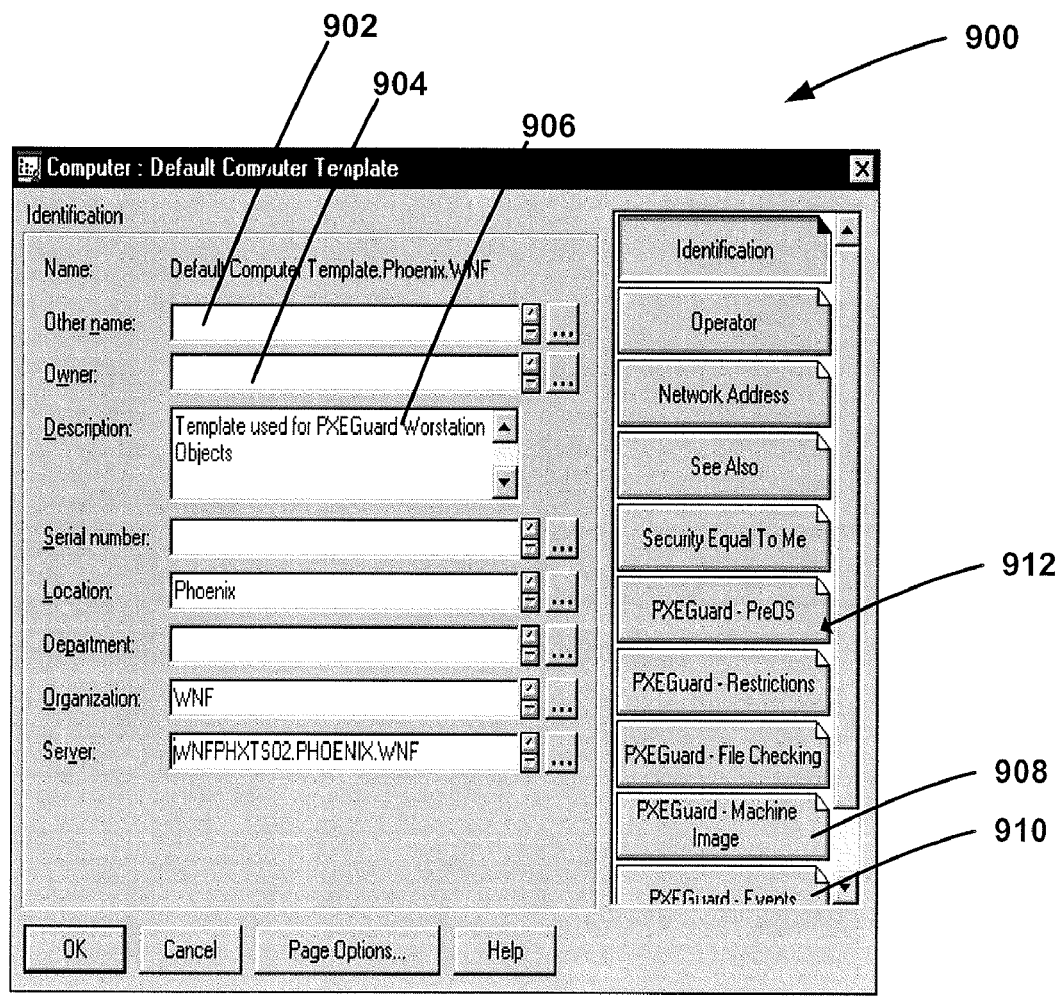
FIGS. 9A, 9B, 9C, 10, 11 and 12 are exemplary interfaces for exemplary server applications.
Figure 9B:
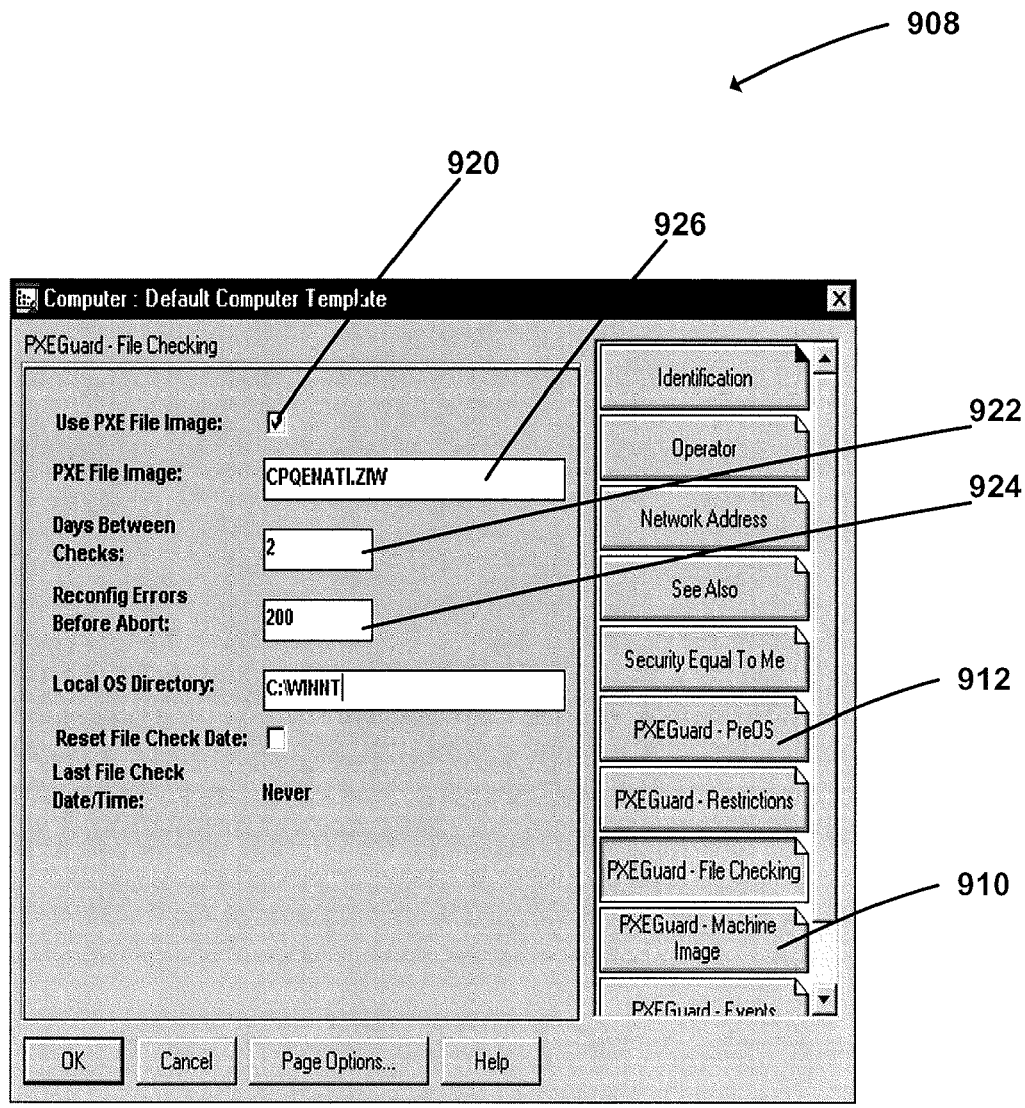
Figure 9C:
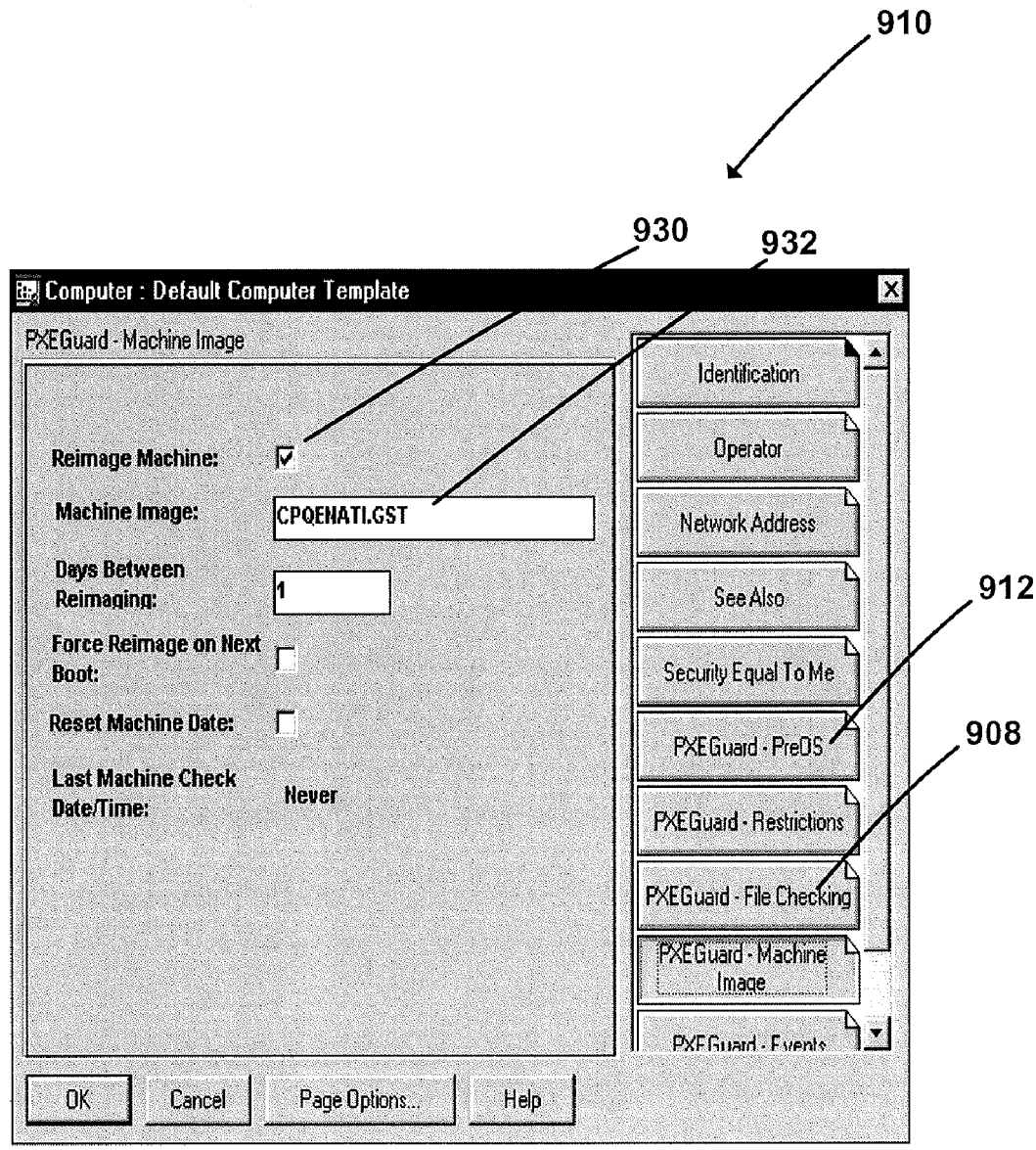

With reference to FIGS. 9A, 9B and 9C, a first exemplary embodiment suitably includes a user interface that accepts data input by an administrator into a datafield (see 902, 904 and 906 in FIG. 9A) to describe the particular client computer 202 associated. Other tabs 908, 910, 912 and the like may provide additional configuration input for the particular script 900, as described below.

Referring now to FIG. 9B, a tab 908 for configuring file management may include a checkbox 920 to activate the file checking feature for the associated client computer 202. The name of the image file associated with the particular client computer 202 may optionally be shown in field 926. The number of days between execution of file checking may be selected in field 922, for example, to configure the frequency of file checking. Similarly, an optional "maximum error" field may be configured in field 924 to select the maximum number of errors that will be corrected on a particular client 202. Registry checking, BIOS checking, file system checking and the like may be configured through similar techniques.

With reference to FIG. 9C, a tab suitable for use in conjunction with re-imaging an entire hard drive (or a portion of a hard drive) is shown. Checkbox 930 indicates whether re-imaging is desired, and field 932 includes the name of an optional image file to be duplicated onto client computer 202. Additional functionality that could be implemented through template 900 includes, without limitation, configuring the frequency of administration, selecting a time or date for which the machine is allowed to boot on the network, selecting a message to be displayed to the user when a machine is booted after a certain date (or a certain number of times), selecting a period to remotely boot the machine (using, for example, Wake On LAN technology implemented in many conventional NICs) and the like. Additionally, the template may be configured to execute the administration process several times consecutively, for example when a machine is booted and configured for the first time. As stated above and as described more fully below, any form of administration may be implemented through server 206 including file system administration, file administration, configuration file administration, BIOS administration, and the like.

With reference now to FIG. 3, a second exemplary embodiment of server application 300 suitably associates configuration scripts 302 with events 304, which in turn may be associated with individual computer templates 306, which in turn may be manually or automatically associated with computer objects 308 and/or computer group objects 310. In various embodiments scripts 302, events 304, templates 306, computers 308 and computer groups 310 may be represented as objects or other data constructs, and may be stored in database 208 and/or in directory services. Various graphical techniques could be used to implement the various object associations. In an exemplary embodiment, the various objects may be represented as objects or other elements in the Netware Directory Services™ or Active Directory™ administration tree and may be managed with the Netware Administrator™ program or Microsoft Management Console™ (MMC).

Scripts 302 suitably contain commands that are executed by client computers 202 as appropriate for the particular configuration tasks desired to be performed. Exemplary commands include executing a program, displaying a message to a user, warm booting client computer 202, starting the local operating system on client computer 202, and the like. Other instructions that may be carried out by various scripts are described more fully below.

Scripts 302 may be associated with events 304 (also referred to as "event objects") to define times that the scripts 302 are executed. Stated another way, event objects 304 suitably instruct script objects when and/or how often to execute. Exemplary types of event objects 304 include "first boot" (corresponding to the first time a client computer 202 is booted within the system), "next boot" (corresponding to the next time the client computer 202 is booted within the system), "Every Boot", "Daily", "Monthly", "Annually", "Wake On LAN" (which may instruct server 206 to "wake" client computer 202 immediately or at a pre-set time, for example by using the Intel "Wake On LAN" standard or a similar technique for booting a computer via a network), and "Time Interval" (which may be automatically or manually configured). An example of a script 302 associated with an event 304 would include associating a "flash BIOS" script with a "Next Boot" event. In such an example, server 206 would provide script 302 in response to the next booting of client computer 202. Script 302 would then provide instructions to client computer 202 to flash client 202's BIOS, as appropriate. Of course many types of event objects 304 could be formulated, and each could be associated with many types of scripts 302.

To configure an event object 304, an administrator suitably selects an object (e.g. a template 306, a computer object 308 or a computer group object 310) to which the new event 304 is to be associated. The administrator then associates a script object 302, and selects a type of event (e.g. "First Boot", "Daily", etc.). Although event objects 305 typically associate with only one script object 302, various embodiments could associate multiple scripts 302 with a single event 304, thus indicating that multiple tasks should be executed at the occurrence of the particular event.

Computer templates (also referred to as computer template objects) 306 may be used to group events together, as described below, and to associate the various types of objects with physical computing devices (e.g. client computer 202). More particularly, template objects 306 may be used to associate a client computer's hardware properties to a database object (such as a Netware Directory Services™ or Microsoft Active Directory™ object), and to associate that client computer 202 to the processes invoked during the pre-boot management process. To continue the example presented above, if "flash BIOS" script 302 and "Next Boot" event 304 were associated with a particular template 306, template 306 would indicate which client computer 202 would have its BIOS flashed at the next boot of the machine. Each template 306 may be associated with multiple events 304 and scripts 306. In various embodiments, default templates 306 may be created that are associated with client computers 202 until a personalized template can be specified. The default template 306 may be associated with scripts to execute standard instructions on all client computers 202 as they are booted for the first time within the system, for example. In such embodiments, one of the instructions in the scripts associated with the default templates might be to interrogate the machine as to its type, operating system, hardware configuration, etc. as described below.

A copy of the default template 306 may be created and suitably modified for each client 202, or new templates 306 may be created from other templates or from scratch as appropriate. Templates 306 may be created or modified by, for example, using an administration program such as the Network Administrator™ program (such as version 5.1 or later) available from the Novell™ corporation, the Microsoft MMC™ or Enterprise Manager™ program available in conjunction with the Active Directory™ product from the Microsoft™ corporation, or any other administration program. Alternatively, templates 306 may be modified by directly opening and editing the contents of the template with a text editor or other program.

Computer objects 308 suitably store physical attributes (such as hardware and firmware settings) of client computers 202. Computer objects 308 may be automatically created upon discovery of a new client computer 202 (e.g. when a client computer 202 sends a first PXE or other boot request to server 206), and may be indexed in database 208 by the unique hexadecimal string associated with each client computer's MAC address, or according to any other indexing scheme. Computer objects 308 may be manually associated with template objects 306 (for example by manually selecting a particular computer object indicator in the Novell Network Administrator™ or Microsoft MMC™ program, or another similar program). Templates 306 may also be automatically associated with a computer object 308 according to, for example, hardware or firmware attributes of a client computer 202. As described more fully above, attributes of a particular client 202 can be determined automatically, and these hardware (or other) attributes may be used to match the particular client computer 202 with an appropriate template 306 within the directory services/database application 308.

Computer group objects 310 may contain collections of computer objects 308, and may be used to associate an attribute (such as an event) with multiple computer objects. A computer group object 310 may be useful, for example, in sending an "update operating system" script to only a subset of client computers 202 running a particular version of an operating system, or in sending a "flash BIOS" message to all client computers of a particular brand. Computer objects 308 or templates 306 may be manually associated with computer group objects 310 in an Administration program, for example. Alternatively, computer objects 308 may be automatically associated with a computer group object 310 according to one or more hardware, software or firmware attributes.

Figure 10:
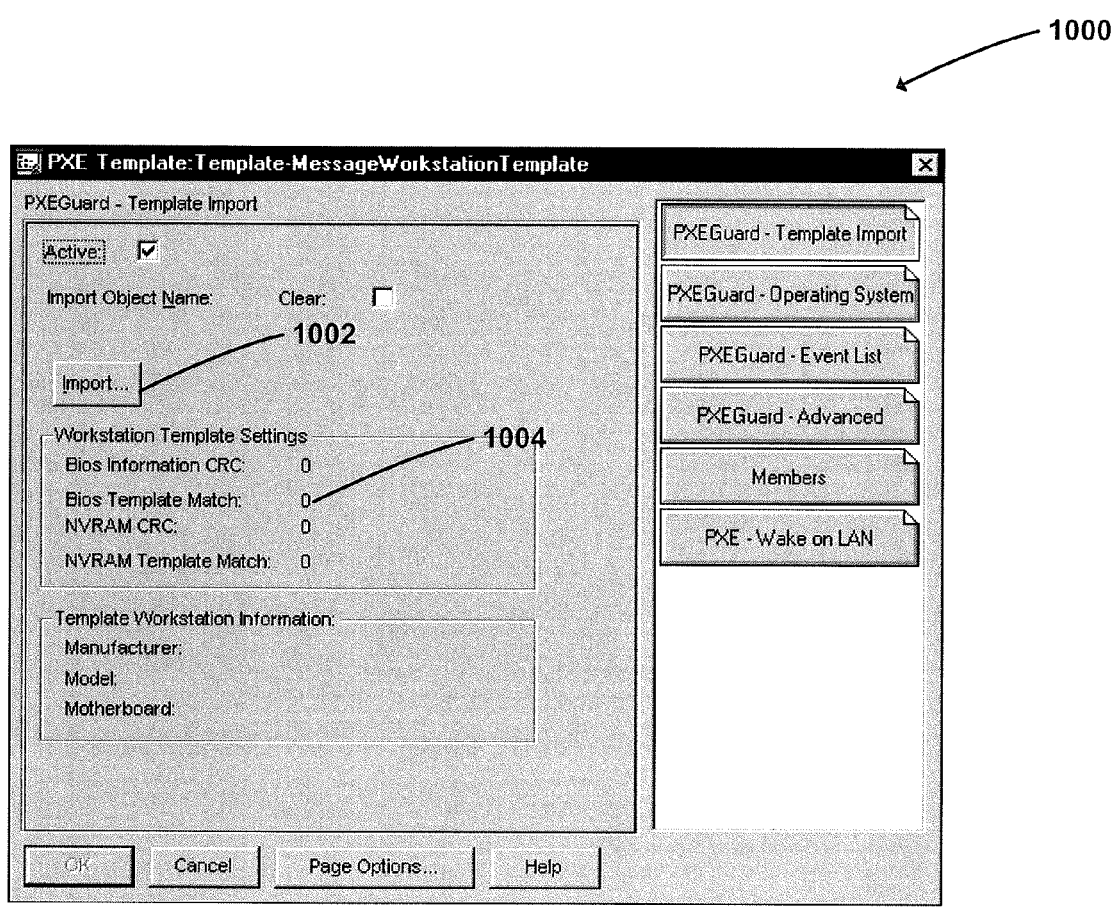
Figure 11:
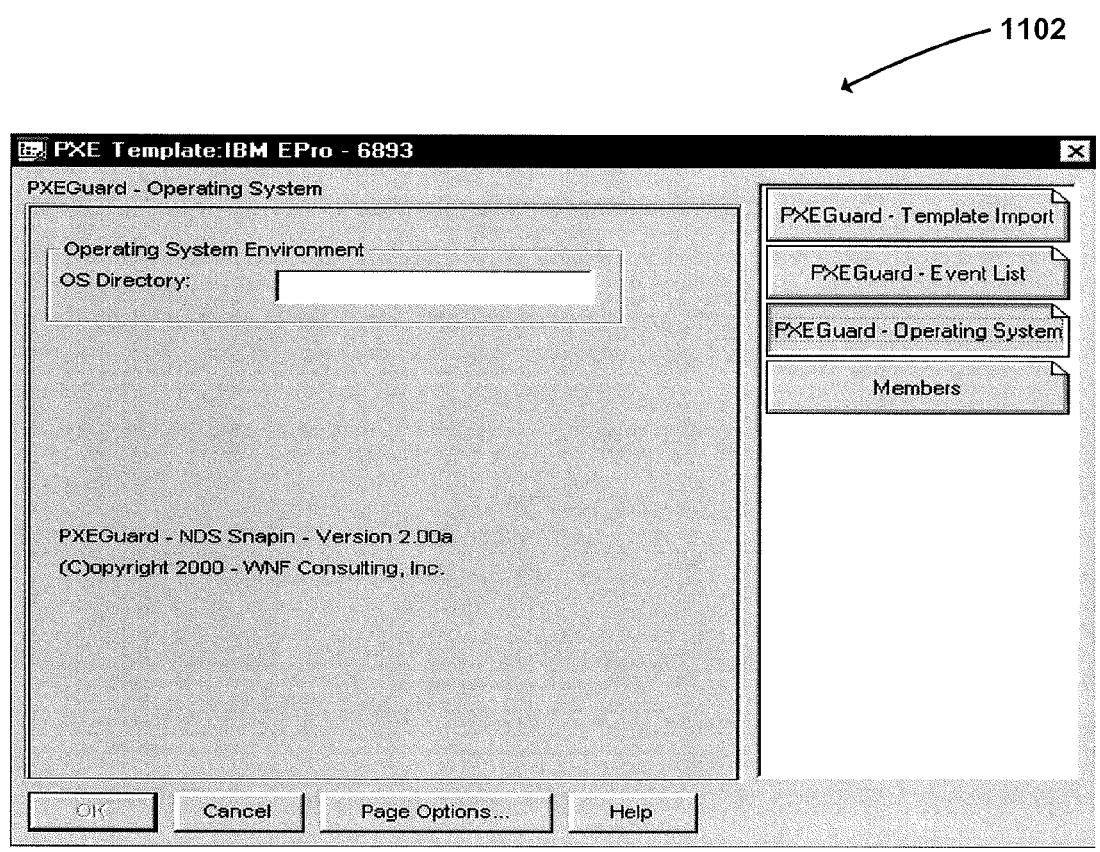
Figure 12:
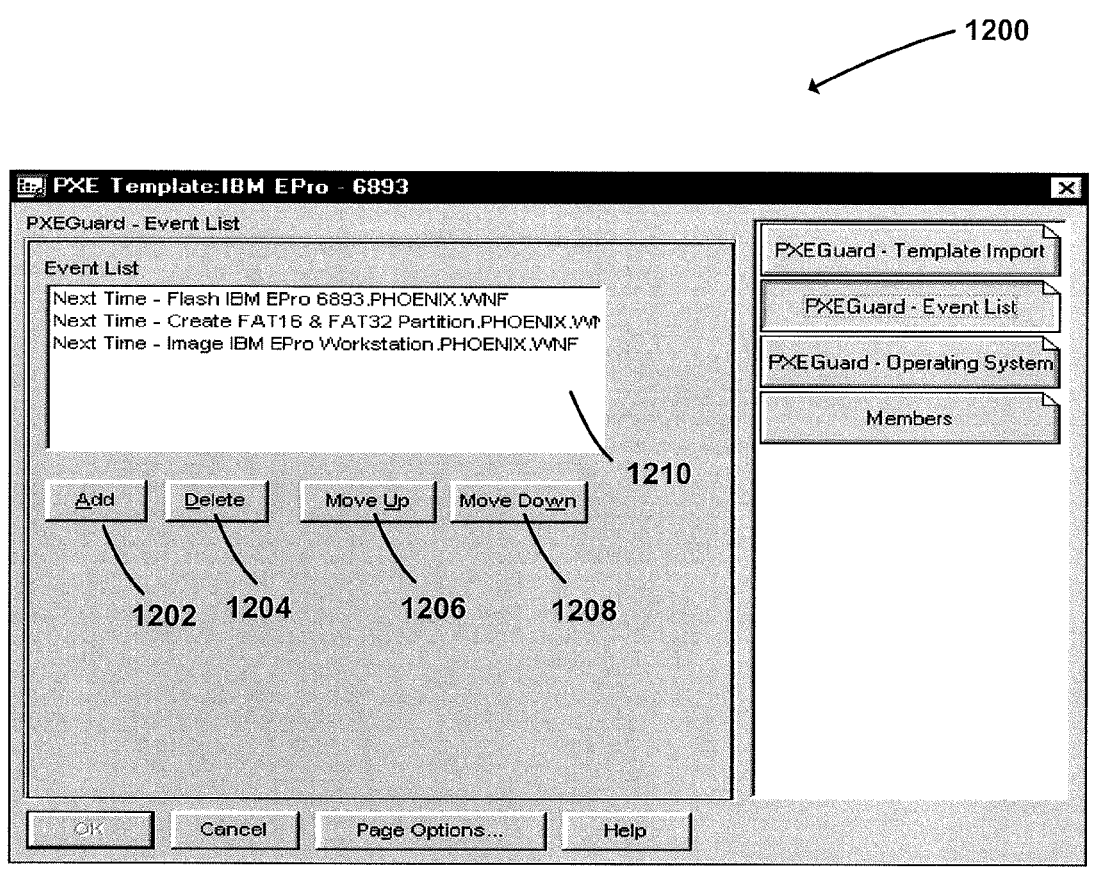

Referring now to FIGS. 10-12, exemplary user interfaces for configuring server application 300 are shown. As stated above, each of the interface windows may be created as, for example, Novell Netware™ or Microsoft MMC™ snapins, or according to any other format or technique.

With reference to FIG. 10, an exemplary template import screen 1000 is shown. Import screen 1000 may be used to import a client computer's hardware settings from a pre-existing computer object 308 into a template object 306. These attributes may define characteristics that may be used to automatically associate a template object 306 with a computer object 308. To operate import screen window 1000, an administrator might click on input button 1002 and select a computer object from the database (e.g. NDS) tree (not shown), as appropriate. A BIOS template match code 1004 may be provided to ensure that the attributes of template 306 match those of the desired workstation objects 308. The BIOS template match code 1004 may be generated according to information stored in a computer's BIOS, such as the computer manufacturer, model number, motherboard number, and PCI hardware (or other hardware) contained within the client computer 202. Moreover, the adapter orientation of the hardware in the PCI (or other) bus (e.g. the order of the cards residing in the various bus slots) may be considered. In various embodiments, if two workstations contain identical BIOS characteristics, it can generally be deduced that the two workstations contain identical hardware configurations, or at least hardware configurations that are sufficiently identical for administration/configuration purposes.

With reference now to FIG. 11, an exemplary operating system screen 1102 is shown. Operating system screen 1102 may be used to populate a template 306 with attribute information that may not be ascertained from the BIOS of client computer 202, such as operating system information. Exemplary information that may be entered into operating system screen 1102 includes directory information about the operating system (e.g. c:\windows, c:\winnt, etc.). In various embodiments, operating system information can be probed directly from client computer 202, as described below.

With reference to FIG. 12, an exemplary events list tab 1200 is shown. Events list tab 1202 may be used to associate event objects 304 with workstation template objects 306, as appropriate. An administrator might add events 304 to a template 306 by, for example, clicking on an "Add" button 1202 and browsing an object tree (such as the NDS tree) to locate an event object 304 desired. Events 304 associated with a template 306 may be displayed in an event list window 1210 in any order. In an exemplary embodiment, events 304 are displayed with top priority events at the top of event list window 1210 and lower priority events nearer the bottom of the window. Event priority may be adjusted by selecting an event 304 and clicking on the "move up" or "move down" buttons (buttons 1206 and 1208, respectively). Events may be deleted from a template 306 by selecting the event 304 in event list window 1210 and then clicking on delete button 1204.

It will be appreciated that various embodiments of server 206 and of server application 300 could be formulated. In particular, many different databases, database structures, programming languages, programming techniques (e.g. hierarchical, object oriented, etc.), object structures, input/output screens, interfaces and the like could be implemented without departing from the scope of the invention.

An Exemplary Pre-Boot Sequence

Figure 4A:
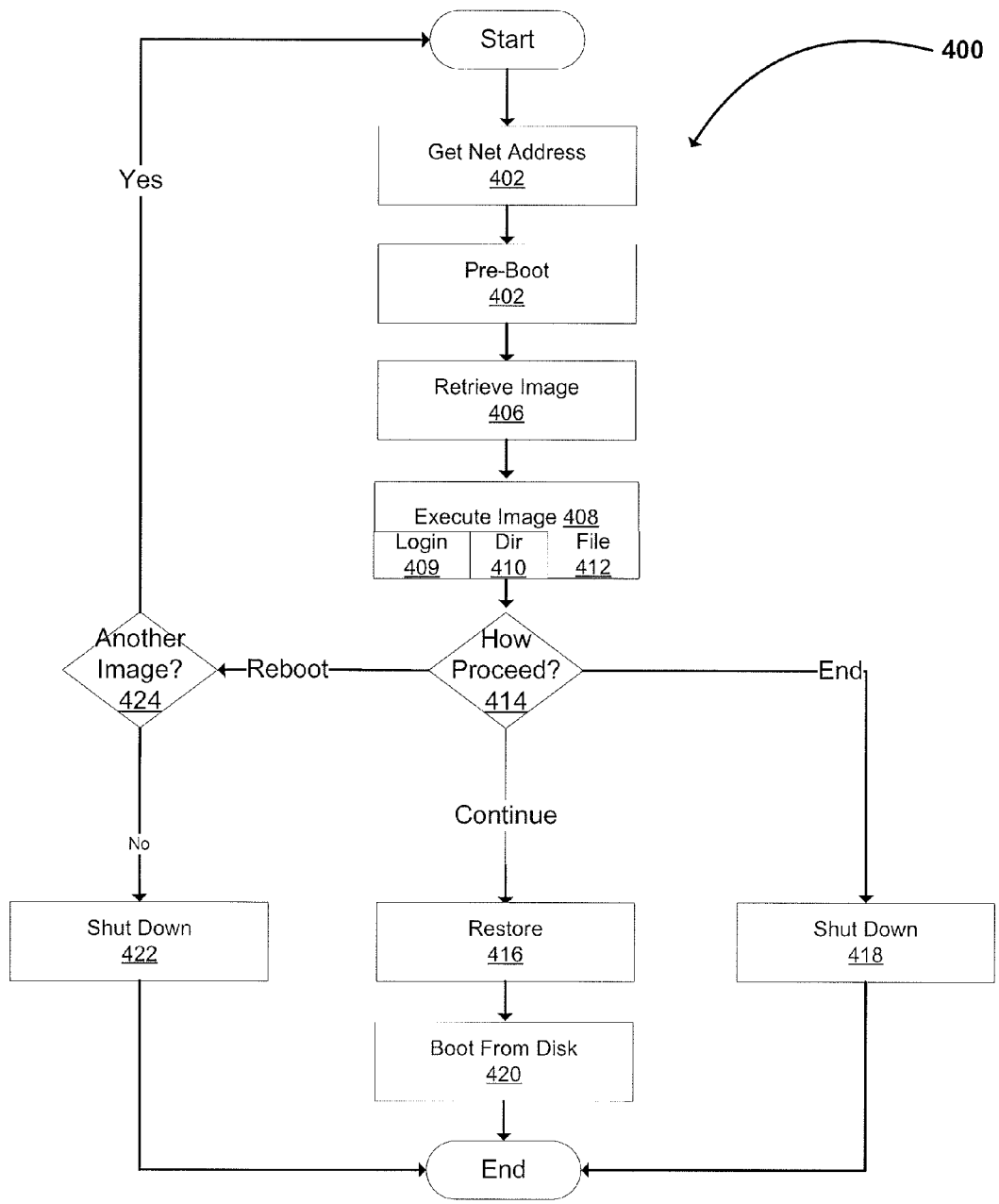
FIG. 4A is a flowchart of an exemplary administration process.
Figure 4B:
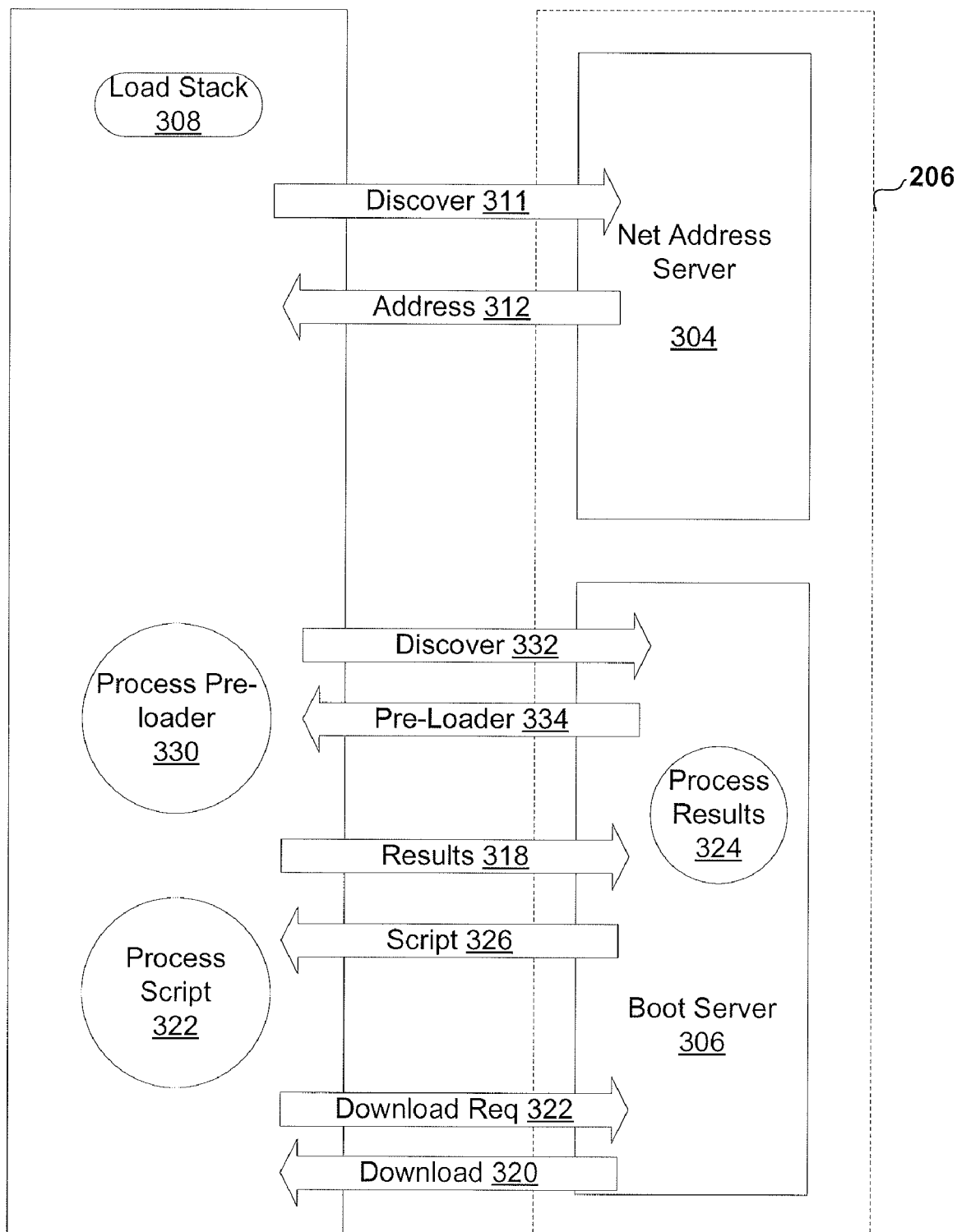
FIG. 4B is a data flow diagram of an exemplary administration process.

With reference to FIGS. 4A and 4B, an exemplary pre-boot sequence (such as a boot sequence that makes use of the PXE specification) may allow one or more client computers 202 to obtain boot information from a server 206, and subsequently to obtain configuration information from server 206. An exemplary process executed by client 202 may include optionally retrieving a network address (step 402), preparing client computer 202 to receive the image at a pre-boot phase (step 404), receiving an image (step 406) and processing scripts to execute various administration/configuration tasks (step 408).

Client 202 computer may access network 210 via, for example, a network protocol stack (such as a TCP/IP stack, an IPX stack, or the like) that may be loaded at system startup. The network stack may be stored, for example, in a ROM associated with the NIC, or in any other suitable location such as in system memory or on a storage device such as a hard drive. In an exemplary embodiment, the network stack utilized in the pre-boot environment is the network stack stored in a PXE-compliant ROM on the NIC.

Before client computer 202 may function as a node on network 210, however, it may require a network address (such as an IP address or an IPX address). Such an address may be stored in RAM, ROM or on a storage device on client computer 202. Other embodiments eliminate the step of obtaining a network address and further communications take place using, for example, the MAC address of client 202.

In various embodiments (particularly those including optional TCP/IP functionality at start up), however, client 202 sends a "discover network address" message 311 on data network 210 to request a network address from a network server (such as server 206). The format of the address request may be in accordance with an address-assignment protocol such as the dynamic host configuration protocol (DHCP) described in, for example, Internet Engineering Task Force (IETF) Request For Comments (RFC) 2131 and 2132 (incorporated herein by reference), although any address assignment technique could be used. Address-request message 311 may be broadcast on the network and received by a network address server 304, which may be a DHCP daemon running on server 206, or any other server.

A network address server (such as server 206) may recognize client 202 by, for example, the MAC address associated with client 202, and may respond with an appropriate response message 312, which may include a client network address, as well as router information, a subnet mask and the like. In various embodiments, the client network address is an internet protocol (IP) address or a Netware™ (IPX™) address, although any network addressing technique could be used.

Exemplary embodiments may also include a boot file name in the response to the address request. Option 67 of the DHCP protocol provides one mechanism for providing such a boot file name, although of course any suitable networking technique or protocol could provide a name of a boot file. The boot file name may describe the name of a file on a server (such as server 206) that is to be executed at boot time. It will be understood that a conventional DHCP packet associates a MAC address of client 202 with an IP address, with an option to include a boot file name on a remote server. Moreover, conventional DHCP typically provides a single boot file name to each client computer 202. Conventional DHCP is therefore typically incapable of providing information that is unique to a particular client 202 without additional enhancements, such as those described herein.

After client computer 202 has obtained a network address (step 402), client 202 may suitably function as a node on network 210. Because client computer 202 has not yet loaded an operating system, however, client computer 202 may next attempt to locate a boot server by sending a boot server request message 332 on network 210. Request 332 may be any type of boot information request such as a message configured in accordance with the PXE specification. In various embodiments, the NIC of client 202 is suitably configured to send a request 332 for PXE services as client computer 202 is booted, or after the computer is booted but before the operating system 106 (FIG. 1) is loaded.

The request for boot services may be received by a daemon or other program running on server 206, which responds with boot information 334 (as described in the PXE specification, for example). Although described as a single server herein, the boot server 306 and the network address server 304 may be implemented on physically and/or logically separate servers.

In various embodiments, server 206 provides a preloader application 334 in response to a request from client computer 202. The preloader application suitably prepares client computer 202 for further configuration, as described more fully below. Formatting of the pre-boot sequence 404 may be in conformance with the PXE standard, or may be according to any other format. Pre-boot instructions are suitably stored in RAM, ROM, PROM, or on any storage device such as a hard drive or CD-ROM prior to boot. Alternatively, the pre-boot instructions 404 may be retrieved from server 206 prior to execution of the image. In such embodiments, a pre-boot loader program may be obtained from server 206. The loader program may be configured to interface directly with the NIC of client computer 202, for example by interfacing with a PXE enabled boot ROM. The loader may initialize the memory in client computer 202 for use by the pre-boot configuration environment, and may request that an operating system kernal be downloaded (for example from server 206), as appropriate. In various embodiments, the loader program uses a network stack stored in the NIC boot ROM to directly access the network (connection 322 in FIG. 3) and to communicate with server 206.

In an exemplary pre-boot sequence 404, client 202 may store some or all of the interrupt service requests (ISRs) on client computer 202 to a known memory or other storage location to facilitate "chain booting" at a later time. In addition (or alternatively), client computer 202 may create a location in memory or on a storage device such as a hard disk for storing the boot image to be received from server 206. An exemplary technique for creating such a storage location is to create a RAM disk in the memory of client 202. Although the RAM disk may be created by any technique, one exemplary sector-imaging method involves blocking out a section of memory on client 202, mapping the memory to emulate the sectors and tracks on a floppy disk, and re-routing the ISRs to the floppy drive to point to the location created in memory.

A boot image may then be retrieved from server 206 (step 406) and suitably stored in the location created in step 404, or otherwise as appropriate. In various embodiments, the boot image retrieved may be formatted as a sector-by-sector representation of a floppy disk (referred to as a "disk image" or "boot image"), although of course other formats could be used. The boot image may be retrieved using any suitable technique 406, such as the TFTP (or UDP) connection 318 described above (which may be facilitated by a PXE enabled boot ROM, for example) or any other method.

The various programs or scripts retrieved with the boot image may be executed (step 408 in FIG. 4), as described below. If the image is stored in a RAM disk as described above, the image may be executed as appropriate by placing a basic input/output system (BIOS) call to the floppy drive. If the ISRs have redirected to the relevant memory location in client 202, BIOS calls to the floppy drive will result in access to the desired location in memory.

In an exemplary embodiment, the boot image suitably includes an operating system kernal, a command interpreter and one or more configuration scripts (which may be executed by the operating system or the command interpreter). In other embodiments, scripts are provided separately from the boot image. Scripts may be provided in response to the attributes of client computer 202 discovered during the pre-boot probing process, for example, and sent via connection 318 to server 306. A more detailed description of an exemplary boot image is provided below in conjunction with FIG. 5.

Server 306 suitably processes the information about client computer 202 and formats or obtains (step 324) an appropriate script that may be returned to client computer 202 as message 326. Alternatively, message 326 could include a program, a file name of a script and/or an address of a script, or another type of pointer to a script file on server 206. In an exemplary embodiment, a configuration script is provided with response message 326 to client 202. Instructions included within the configuration script may instruct client 202 to establish connections 322/320 with server 306 to transfer administrative data or files, for example. Client 202 may then establish a file transfer connection 322 with boot server 306 and request download of additional configuration scripts and/or other information, as appropriate. Although any file transfer technique could be used to establish connection 322, various embodiments employ the trivial file transfer protocol (TFTP) described by the IETF in various RFCs, such as RFC 1350. Alternatively, the user datagram protocol (UDP) or another protocol could be used to implement connection 322. Boot server 306 may then provide one or more programs, scripts, data or the like to client 202 via the connection established. Information provided to client 202 may include one or more of a pre-operating system image, a machine image, a file image, a configuration environment, one or more rule sets, or the like, as described more fully below. Client 202 may then execute the downloaded programs at step 322/408, as appropriate. Alternatively, the functionality described in conjunction with messages 322 and 320 may be eliminated in various embodiments, or may be suitably combined with messages 318 and 326, as appropriate.

It will be understood that the various interactions between client 202 and server 206 may be combined, separated or otherwise processed in ways other than those described above without departing from the ambit of the invention. Various embodiments of server 206 could provide network address and boot image information simultaneously, for example. An alternate embodiment might transferring configuration information via a TCP/IP connection such as via the TCP/IP stack commonly included within many PXE compliant NICs. In such embodiments, a TCP/IP address may be obtained via, for example, a DHCP request and a disk image and other information may be transferred from server 306 via an NFS, TFTP or other virtual connection. In such embodiments, the interrupt service routines (ISRs) of client computer 202 may be configured (for example, by the preloader) such that service requests typically directed to a drive represented by a letter (e.g. drive X:, Y:, Z:, or any other drive letter) are redirected to the TCP/IP stack contained in the NIC. In such embodiments client 202 may obtain data from a file on server 206 that may be partitioned with sector and/or track information (i.e. as a disk drive).

Various configuration options may be available to client 202. A batch file or script may suitably direct these options (shown as step 414 in FIG. 4), or a user or administrator may provide the desired option in real time. After configuration is complete, client machine 202 may be shut down (step 418), rebooted to obtain another network image as described more fully below (steps 424 and 422), or chain booted to an operating system stored on a hard disk affiliated with client 202 (step 420). In the latter case, ISRs stored in connection with pre-boot phase 404 are suitably restored, and a BIOS call is placed to boot the machine from the hard disk or other storage device.

Exemplary Client Processes

Figure 5:
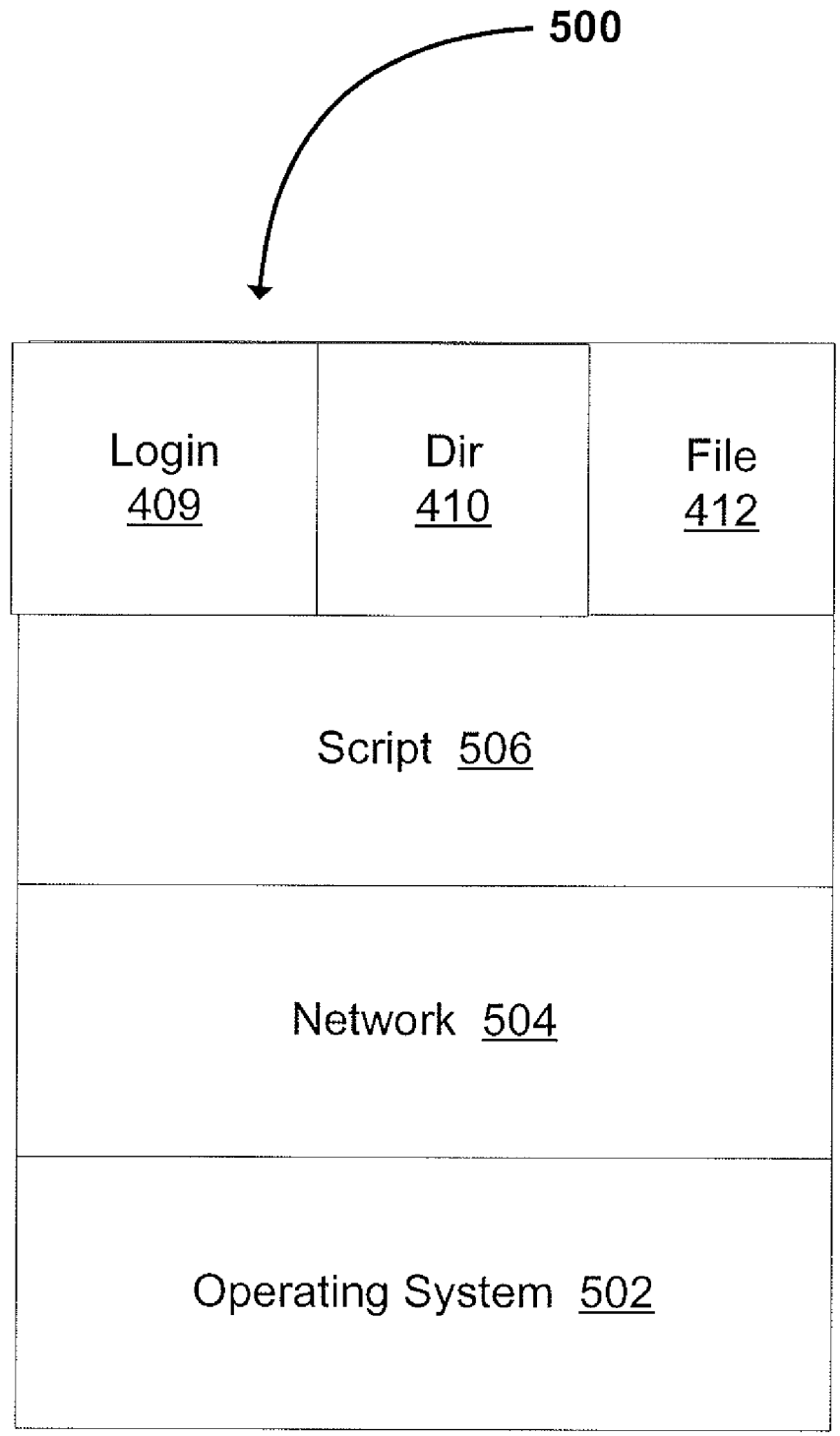
FIG. 5 is a block diagram of an exemplary client software.

With reference now to FIG. 5, various embodiments of exemplary client software (which may be provided with boot image 500) may include a bootable operating system (OS) 502 such as DOS™, LINUX™, UNIX™ or the like. Operating system 502 may be include a small operating system kernal (such as a DOS™ or LINUX™ kernal), a command processor, an extended memory manager and a command interpreter 506. In an exemplary embodiment, operating system 502 automatically executes command interpreter 506 after the kernal is loaded.

Command interpreter 506 suitably executes a script interpreter that interprets script instructions and, in various embodiments, executes other appropriate script interpreter programs such as a REXX interpreter, PERL interpreter, batch file interpreter, or the like. In various embodiments, command interpreter 506 may be modified to allow access to the PXE ROM or another boot ROM so that file transfers and other input/output routines take place via the ROM. This modification may be implemented by, for example, redirecting disk calls to the memory address associated with the ROM. In various embodiments, the command interpreter obtains transaction data from server 206, as appropriate. In various embodiments, command interpreter 506 configures network layer 514 (which may include a protocol stack and a redirector, not shown in FIG. 5) to establish a network connection with server 206. Command interpreter 506 may establish a socket level connection to server 206, for example, and may issue requests to server 206 for transaction packages (i.e. scripts and other data) as appropriate.

Command interpreter 506 may then receive transaction packages from the server and execute script or other commands for the tasks to be accomplished. Scripts executed by command interpreter 506 may be ASCII files or other files that include commands to be executed within the pre-boot configuration environment. Scripts may be assembled by server 206, as described below.

Various embodiments may include scripting or other instructions to probe client computer 202 to determine information relating to the file system, files, BIOS, hardware configuration, software configuration, operating system configuration and the like on client computer 202. Probing may take place in response to scripting provided by server 206, for example, and may be particularly useful when client computer 202 has a MAC address that was not previously known to server 206 (thus indicating that client computer 202 may be connected to network 210 for the first time). Probing may be accomplished by any method such as by placing queries to the system bus, the hard drive partition table, and the like. The probing script/application may also open and inspect various files stored on the hard drive to determine configuration information. Such files may include configuration files, operating system files, and the like.

Information about client computer 202 may be obtained from numerous sources. The oemsetup.inf file typically present in the various forms of the Microsoft Windows operating systems, for example, generally includes information about registry keys and files that are required by the operating system. This file may be investigated to identify files on a particular computer that may need to be investigated, verified, repaired and/or replaced. Similarly, BIOS information, hardware information and the like can be obtained via, for example, investigating the distributed management interface (DMI) parameters of client computer 202. DMI parameters are described in detail in, for example, the Desktop Management Interface Specification Version 2.0s dated Jun. 24, 1998, available online from the Desktop Management Taskforce and incorporated in its entirety herein by reference. SMBIOS (formerly known as DMI BIOS) also maintains information about the client computer 202 that is provided by the system manufacturer, so SMBIOS information may be queried in addition to or in place of DMI or other BIOS information. Other system information may be obtained by querying the system bus to determine devices communicating on the bus such as hard drives, other storage devices, network cards and the like. The arrangement and order of cards inserted into the system bus of client computer 202 may also be determined, for example by polling the various locations on the bus in order. Common bus architectures include, without limitation, AGP, ISA, PCI, SCSI, USB and Firewire buses, although of course any bus architecture could be queried by the preloader. Similarly, information about files and file systems may be obtained from the partition table of the hard drive, for example. Common disk formats that may be queried include FAT16, FAT32, AFS, NTFS, S5, or any other disk format. Relevant system information may be provided to server 206 as described above or otherwise, as appropriate.

Various other programs that may be included within the boot image or that may be obtained from server 206 include a login program 409, a file management program 412, and/or a registry (or directory) management program 410. Programs 409, 410 and 412 may be compiled programs that are executable by operating system 502, or they may be scripts that are executable by command interpreter 506. Different embodiments might employ different programs to accomplish different purposes in administering client computer 202, as described below. A "zip" or other file compression/archive creation program may also be provided in various embodiments.

Login program 409 may suitably establish a secure or insecure file level attachment to server 206 using, for example, a pre-defined account within database/directory services application 208. Login program 409 may be called by the batch or script file discussed above, and may also create a virtual network connection to server 206 to map a directory on server 206 to a local disk drive of client 202 using, for example, conventional networking techniques. By mounting a remote directory as a local drive, client 202 may gain access to programs that are not included with boot image 500. In various embodiments, login program 409 further places a query to database 208 to obtain attributes stored in the database corresponding to the particular client 202. When the particular attributes of client 202 are retrieved, login program 409 may generate environmental variables, batch file flags, or other signals based upon the attributes that may be used by other administrative programs. Various embodiments of login program 409 further provide configurable environmental variables corresponding to directories for temporary or swap files, and provide error codes corresponding to success or failure in contacting database 208 or establishing the virtual connection with server 206.

File management program 412 may be used to manage file integrity on the local hard drive or another storage device affiliated with client 202. In various embodiments, a file level image of the storage device is created by, for example, scanning the hard drive (or a particular portion of the hard drive, such as that portion storing operating system files or other files of interest) to create an index of the files. The index may to contain a listing of the relevant files, the size of the files, the file location and/or other information about the files. A separate disk image that includes the files themselves may also be created. In such embodiments, the index file may be created from the image file, which may be stored on server 206 or on client 202. The index may also contain a time or date stamp of the image, along with information relating to the size of the image and/or a checksum of the file. The checksum may be suitably calculated by any conventional checksum routine such as CRC32, or any other routine. The index may also contain a pointer to the image file itself. In various embodiments, a single image file may be created for one or more client computers 202. In such embodiments, the image file may be downloaded from server 202 during the pre-boot process, or as necessary to aid in system configuration and maintenance.

When file administration program 412 is executed, the index may be compared to files actually in place on the storage device of client computer 202 to identify files that are missing, damaged, changed, or the like. Files that have been changed may be recognized by checksums or date/time stamps that differ from those stored in the index. Such files may then be retrieved from the image stored on server 206 and replaced as appropriate. In this manner, operating system files, application files and the like may be suitably replaced or repaired as part of a pre-boot process, thus allowing administration of the machine even when the operating system layer 106 or application layer 108 is corrupted. It will be understood that various schemes of comparing existing files on a particular client 202 to an ideal set of files stored in an image on server 206 could be formulated without departing from the spirit or scope of the invention. For example, an index of the image file may be compared to the files on the client computer 202, or an index of the files on client computer 202 may be compared to an image file.

Figure 6:
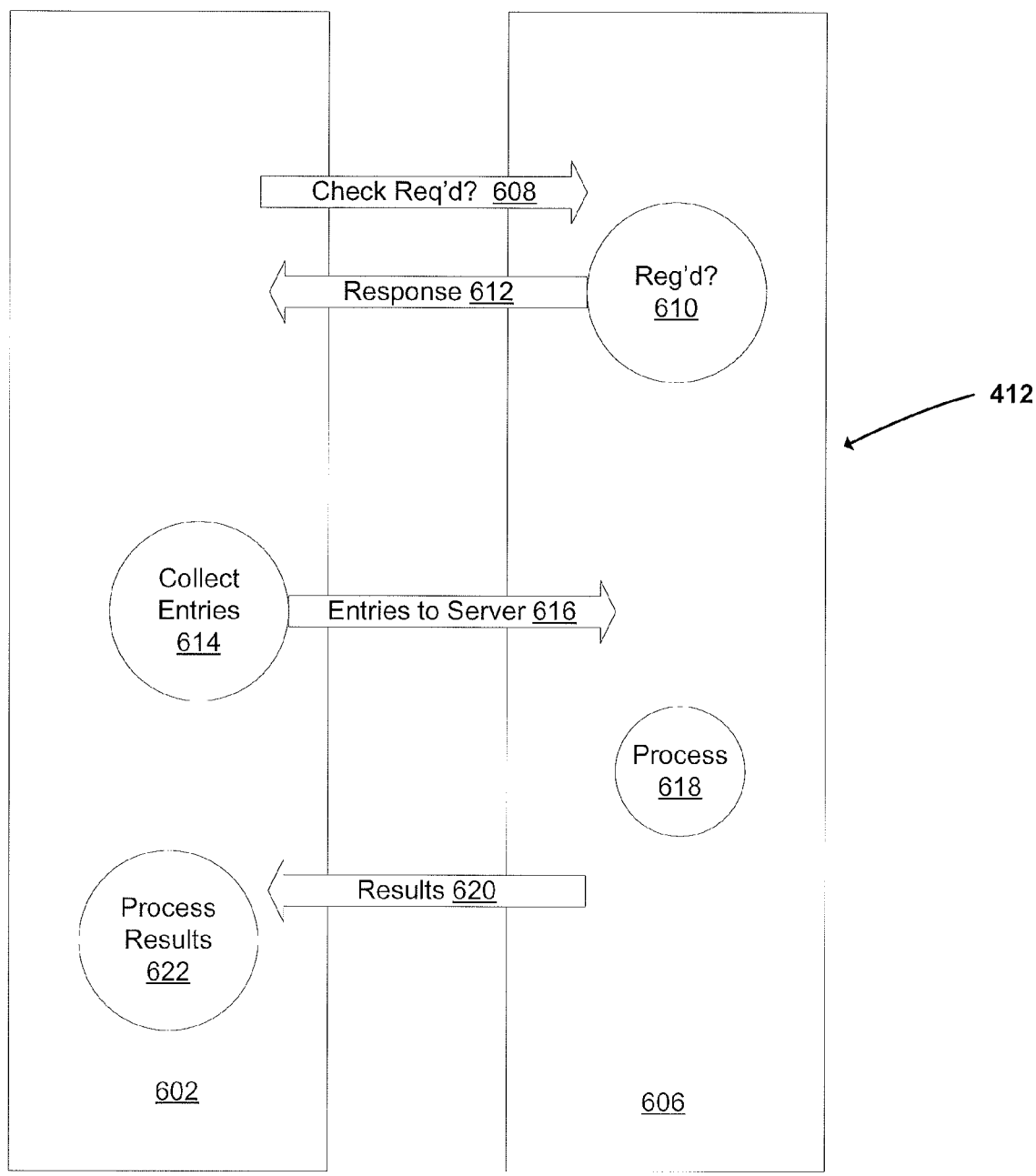
FIG. 6 is a data flow diagram of an exemplary file administration process.

Referring now to FIG. 6, an alternate embodiment of file administration program 412 suitably separates tasks into a client portion 602 running on client computer 202 and a server portion 606 running, for example, on server computer 206. Client portion 602 optionally contacts server portion 606 to determine if a check is required (608 in FIG. 6). Server 606 may receive message 608 and may determine if a check is required by, for example, comparing the number of days since the last check. Alternatively, server 606 may determine if an administrator has requested that that particular client 202 check its files. If a check is not required, a response message 612 is sent to the client, and the process may be terminated. If a check is desired, server 606 suitably determines the proper parameters required to perform the check and notifies client 602 via response 612. Client 602 may then collect the index or directory information as appropriate. One method of compiling the required information is to produce an index file as described above, but of course any method or format of data collection that is responsive to server 606 could be used. Client 602 may then provide the necessary data to server 606 though message 616. Server 606 suitably processes the index file by, for example, comparing the contents of the index file with the contents of an image maintained on server 206. A results message 620 is then sent to the client 602 as appropriate. Results 620 may contain updated files for placement on client computer 202; alternatively, results 620 may contain an error code (indicating, for example, that the check could not be performed or that a threshold number of errors in the index was identified) or an indication that the processing terminated properly, but that no changes to client computer 202 were required. Of course, various methods of separating processing and comparing tasks between client 202 and server 206 could be formulated.

With momentary reference again to FIGS. 4A and 5, registry/directory administration program 410 may be suitably used to administer the registry associated with the operating system stored on a hard disk or other storage device affiliated with client computer 202. The Windows 95™, 2000™ and NT™ operating systems, for example, maintain a registry of hardware configurations, software files, and the like. This registry may be stored as a file on client computer 202. Registry administration program 410 suitably compares the registry to a duplicate registry stored on server 206 or on client computer 202 to determine any configuration errors or to adjust configuration parameters. Alternatively, registry administration program 410 may identify registry files or keys used by client computer 202 by, for example, checking an oemsetup.inf file. Keys identified in the file can be compared with, for example, keys required by the hardware on client 202 identified by the preloader. The registry itself can be scanned and any keys that are missing can be added, repaired, or replaced based upon the key data identified.

Figure 7:
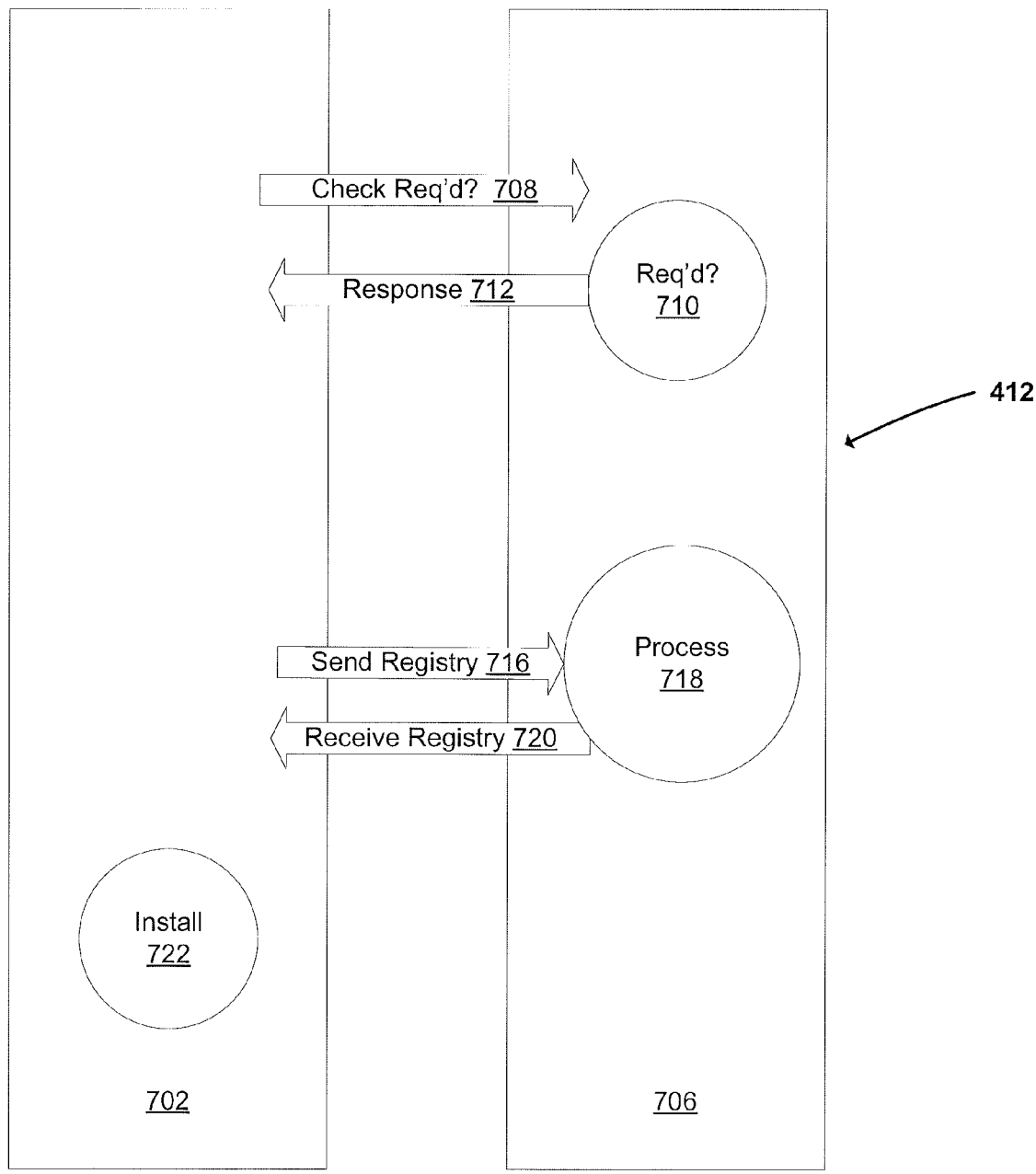
FIG. 7 is a data flow diagram of an exemplary registry administration process.

Referring now to FIG. 7, an alternate embodiment of registry administration program 410 suitably separates tasks into a client portion 702 running on client 202 and a server portion 706 running on server 206. Client 702 optionally contacts server 706 to determine if a check is required (step 708 in FIG. 7). Server 706 receives message 708 and determines if a check is required by, for example, comparing the number of days since the last check or determining if an administrator has requested that that particular client 702 check its registry. If a check is not required, a response message 712 is sent to the client, and the process is suitably terminated. If a check is desired, server 706 suitably determines the proper parameters required to perform the check and notifies client 702 via response 712. Client 702 may provide a copy of the registry to server 706 though message 716 and may wait for a response. Server 706 may then process the registry by, for example, comparing the contents of the registry file with the contents of an image registry maintained on server 206. The registry file from client 202 may then be suitably modified or replaced with a new registry file from server 206. A substitute registry 720 may then be sent to the client 702 as appropriate. Results 720 may contain an updated registry for client computer 202; alternatively, results 720 may contain an error code (indicating, for example, that the check could not be performed or that a threshold number of errors in the index was identified) or an indication that the processing terminated properly, but that no changes to client computer 202 were required. Of course, various methods of separating tasks between client 202 and server 206 could be formulated.

Again with reference to FIGS. 4 and 5, it will be appreciated that any parameters of client computer 202 may be verified, adjusted, repaired or replaced. BIOS information, for example, may be verified and modified through DMI procedures. Similarly, files and file systems may be verified, moved, replaced or altered as described above. Hence, the techniques described herein may be expanded to adjust or otherwise maintain any aspect of client computer 202 including the file system, files, configuration files, firmware, BIOS, and the like.

With reference now to FIGS. 1-11, it will be appreciated that a client computer 202 may be connected to a network 210 and booted, whereupon a message (such as a PXE message) is sent to a server 206. Server 206 may identify client computer 202 by the client's MAC address, and may provide a preloader program to prepare client 202 for receiving configuration data. The preloader may create a memory location for a boot image, which may include an operating system and/or a command interpreter. Instructions to client 202 from server 206 may be executed by the operating system and/or the command interpreter, and may be provided in script form. Exemplary instructions gather data about client computer 202 such as the type of computer, amount of memory, type of hard drive, operating system, and the like. Based upon this information and instructions from a network administrator, server 206 may formulate specific script for client 202 that includes instructions to repair, verify, replace or otherwise administer/configure particular application attributes, file system attributes, file attributes, operating system attributes, BIOS attributes or the like. Because the preloader, boot image, and scripts may be provided from the server 206 prior to booting operating system 106 on client computer 102, the administration process may take place even if the network layer 104, operating system 106 or application layer 108 of client 202 are not operating properly. Moreover, client computer 202 may be administered from any location on network 210, including remote locations.

The corresponding structures, materials, acts and equivalents of all elements in the claims below are intended to include any structure, material or acts for performing the functions in combination with other claimed elements as specifically claimed. The scope of the invention should be determined by the appended claims and their legal equivalents, rather than by the examples given above. For example, the steps recited in any method claims may be executed in any order, and are not limited to the order presented in the claims. Moreover, no element is essential to the practice of the invention unless specifically described herein as "critical" or "essential".

The invention claimed is:

1. A method of remotely maintaining a client computer from a server computer, wherein the client computer comprises a plurality of attributes, a network interface card (NIC) and a local operating system, the method comprising the steps of:
   providing a preboot attribute determination application from the server computer to the client computer via the network interface card prior to said client computer loading said local operating system;
   determining said plurality of attributes of said client computer with the preboot attribute determination application executing on said client computer prior to said client computer loading said local operating system;
   receiving said plurality of attributes from said client computer at the server computer;
   automatically selecting one of a plurality of management instruction sets stored on said server computer for said client computer, wherein said one of said plurality of management instruction sets is selected by said server computer based upon said plurality of attributes of said client computer determined by said preboot attribute determination program; and
   providing said one of said plurality of management instructions from said server computer to said client computer to thereby allow said client computer to execute said one of said plurality of management instruction sets at said client computer prior to loading said local operating system.

2. The method of claim 1 wherein said plurality of attributes comprise hardware attributes.

3. The method of claim 1 wherein said plurality of attributes comprise firmware attributes.

4. The method of claim 1 wherein said plurality of attributes comprise desktop management interface (DMI) attributes.

5. The method of claim 1 wherein said plurality of attributes comprise PCI attributes.

6. The method of claim 1 wherein said plurality of attributes comprise SMBIOS attributes.

7. The method of claim 1 wherein said plurality of attributes comprise at least one of the group consisting of system manufacturer, model, motherboard type, bus information, and adapter information.

8. The method of claim 7 wherein said adapter information comprises information about adapter orientation within a system bus of said client computer.

9. The method of claim 1 wherein said client computer comprises a file system and wherein the method further comprises the step of verifying said file system of said client computer.

10. The method of claim 9 wherein said step of verifying said file system comprises checking the files in said file system against an index file.

11. The method of claim 10 wherein said index file is retained on said server computer and wherein said step of verifying said file system is executed on said server computer.

12. The method of claim 10 wherein said index file is retained on said client computer and wherein said step of verifying said file system is executed on said client computer.

13. The method of claim 10 wherein said index file is compressed.

14. The method of claim 10 wherein files missing from said file system are retrieved from said server computer.

15. The method of claim 14 wherein said files are accessed using the PXE protocol.

16. The method of claim 10 wherein said index file corresponds to said attributes of said client computer.

17. The method of claim 1 wherein said contacting step is performed in accordance with the PXE protocol.

18. The method of claim 1 further comprising the step of mounting a remote drive from said server computer to said client computer.

19. The method of claim 18 wherein said step of executing said management instructions comprises accessing data files on said remote drive.

20. The method of claim 1 wherein said client computer comprises a registry file and wherein the method further comprises the step of verifying said registry file of said client computer.

21. The method of claim 20 wherein said step of verifying said registry file comprises checking entries in said registry file against a registry index file.

22. The method of claim 20 wherein said registry index file is retained on said server computer and wherein said step of verifying said registry file is executed on said server computer.

23. The method of claim 20 wherein said registry index file is retained on said client computer and wherein said step of verifying said registry file is executed on said client computer.

24. The method of claim 20 wherein said registry index file corresponds to at least a portion of said plurality of attributes of said client computer.

25. A method of remotely managing a client computer having a local operating system, the method comprising the steps of:
   providing an attribute determination program from a server in response to a request from said client computer;
   executing the attribute determination program on the client computer to identify a plurality of attributes of said client computer prior to said client computer loading the local operating system and to provide said attributes to said server;
   receiving said attributes from said attribute determination program at said server;
   automatically selecting one of a plurality of management instructions for said client computer at said server as a function of said attributes obtained from said attribute determination program; and
   providing said one of said plurality of management instructions from said server to said client computer prior to booting said local operating system of client computer.

26. The method of claim 25 wherein said attributes comprise hardware attributes.

27. The method of claim 26 wherein said attributes comprise firmware attributes.

28. A computer readable medium having instructions stored thereon for executing the method of claim 27.

29. The method of claim 25 further comprising the step of executing said one of said plurality of management instructions at said client computer.

30. The method of claim 29 wherein said one of said plurality of management instructions comprises at least one of a plurality of scripts.

31. The method of claim 30 wherein at least one of said plurality of scripts is a REXX script.

32. The method of claim 30 wherein at least one of said plurality of scripts is a PERL script.

33. The method of claim 30 wherein at least one of said plurality of scripts is a batch script.

34. A computer readable medium having instructions stored thereon for executing the method of claim 33.

35. The method of claim 30 wherein each of said plurality of scripts is associated with a workstation object at said server, wherein said workstation object is associated with said client computer.

36. The method of claim 30 wherein each script comprises instructions for executing one or more tasks in response to the occurrence of at least one event.

37. The method of claim 36 wherein at least one of said templates is associated with said script at said server through an event object.

38. The method of claim 36 wherein at least one of said templates is associated with said script at said server via a workstation group object.

39. The method of claim 36 wherein at least one of said templates is associated with said script at said server via said attributes of said client computer.

40. The method of claim 39 wherein said attributes comprise hardware attributes.

41. The method of claim 40 wherein said attributes comprise at least one of the group consisting of manufacturer, model, motherboard type, bus information and adapter information.

42. The method of claim 41 wherein said providing step and said receiving step are in accordance with the PXE protocol.

43. A computer readable medium having instructions stored thereon for executing the method of claim 41.

44. The method of claim 40 wherein said attributes comprise PCI attributes.

45. A computer readable medium having instructions stored thereon for executing the method of claim 44.

46. The method of claim 40 wherein said attributes are DMI attributes.

47. The method of claim 40 wherein said attributes are SMBIOS attributes.

48. A computer readable medium having instructions stored thereon for executing the method of claim 47.

49. The method of claim 39 wherein said providing step and said receiving step are in accordance with the PXE protocol.

50. The method of claim 29 further comprising the step of mounting a remote volume of said server computer on said client computer.

51. The method of claim 50 wherein said step of executing said management instructions comprises accessing files stored on said remote volume.

52. The method of claim 51 wherein said client computer comprises a file system and wherein said step of managing said client computer comprises verifying said file system of said client computer.

53. The method of claim 52 wherein files missing from said file system are retrieved from said remote volume.

54. The method of claim 51 wherein said step of verifying said file system comprises checking the files in said file system against an index file.

55. A computer readable medium having instructions stored thereon for executing the method of claim 51.

56. The method of claim 25 wherein said client computer comprises a file system and wherein said selecting step comprises verifying said file system of said client computer.

57. The method of claim 56 wherein said step of verifying said file system comprises checking the files in said file system against an index file.

58. The method of claim 57 wherein said index file is retained on said server computer and wherein said step of verifying said file system is executed on said server computer.

59. The method of claim 57 wherein said index file is retained on said client computer and wherein said step of verifying said file system is executed on said client computer.

60. The method of claim 57 wherein said index file is compressed.

61. The method of claim 57 wherein files missing from said file system are retrieved from said server computer.

62. The method of claim 61 wherein said files are retrieved using the PXE TFTP protocol.

63. The method of claim 57 wherein said index file corresponds to said attributes of said client computer.

64. A computer readable medium having instructions stored thereon for executing the method of claim 63.

65. The method of claim 25 wherein said client computer comprises a registry file and wherein said selecting step comprises verifying said registry file of said client computer.

66. The method of claim 65 wherein said step of verifying said registry file comprises checking entries in said registry file against a registry index file.

67. The method of claim 66 wherein said registry index file is retained on said server computer and wherein said step of verifying said registry file is executed on said server computer.

68. The method of claim 66 wherein said registry index file is retained on said client computer and wherein said step of verifying said registry file is executed on said client computer.

69. The method of claim 66 wherein said registry index file corresponds to said attributes of said client computer.

70. A computer readable medium having instructions stored thereon for executing the method of claim 69.

71. A computer readable medium having instructions stored thereon for executing the method of claim 65.

72. A computer readable medium having instructions stored thereon for executing the method of claim 25.

73. A system for managing a client computer over a network, the client computer having a plurality of client computer attributes and a local operating system, the system comprising:
    a database configured to store a plurality of template records, each of said plurality of template records comprising a set of template attributes and a corresponding one of a plurality of configuration scripts; and
    a server application configured to receive a request from said client computer via said network, to provide a preboot attribute determination program to the client computer in response to the request, to receive said client computer attributes from the preboot attribute determination program executing on the client computer prior to said client computer booting said local operating system, to associate said client computer with at least one of said template records by comparing said client computer attributes to said template attributes, and to select the one of the plurality of configuration scripts corresponding to the associated at least one of said template records to be provided to said client computer for execution on said client computer prior to booting a local operating system.

74. The system of claim 73 wherein said records of information comprise attributes of said client computers.

75. The system of claim 74 wherein said attributes comprise DMI attributes.

76. The system of claim 74 wherein said attributes comprise PCI attributes.

77. The system of claim 74 wherein said attributes comprise SMBIOS attributes.

78. The system of claim 73 further comprising event objects associated with at least one of said template records, wherein said event objects are associated with said configuration scripts such that said configuration scripts are provided to said client computers upon the occurrence of an event.

79. The system of claim 78 wherein said event comprises the booting of one of said client computers.

80. The system of claim 78 wherein said database is a directory services application.

81. The system of claim 80 wherein said directory services application is a Netware Directory Services™ directory.

82. The system of claim 80 wherein said directory services application is a Microsoft Active Directory™ directory.

83. A system for administrating a client computer over a network, the system comprising:
   means for providing a preboot attribute determination application from a server computer to the client computer via the network interface card prior to said client computer loading said local operating system;
   means for determining said plurality of attributes of said client computer with the preboot attribute determination application executing on said client computer prior to said client computer loading said local operating system;
   means for receiving said plurality of attributes from said client computer at the server computer;
   means for automatically selecting one of a plurality of management instruction sets stored on said server computer for said client computer, wherein said one of said plurality of management instruction sets is selected by said server computer based upon said plurality of attributes of said client computer determined by said preboot attribute determination program; and
   means for providing said one of said plurality of management instructions from said server computer to said client computer to thereby allow said client computer to execute said one of said plurality of management instruction sets at said client computer prior to loading said local operating system.

84. The system of claim 83 wherein said determining means comprises means for querying hardware and software attributes of said client computer.

85. The system of claim 84 wherein said querying means comprises means for querying DMI parameters of said client computer.

86. The system of claim 84 wherein said querying means comprises means for querying PCI parameters of said client computer.

87. The system of claim 84 wherein said querying means comprises means for querying SMBIOS parameters of said client computer.

88. A method of maintaining files on a client computer having a local operating system and a network interface card, the method comprising the steps of:
   receiving a boot request at a server computer from said client computer;
   providing a response to said boot request from said server to said client via said network interface card, wherein said response comprises an attribute determination program configured to be executed on said client computer prior to booting said local operating system, wherein the attribute determination program is configured to prepare an index of files present on said client computer;
   receiving the index of files present on said client computer from said attribute determination program prior to booting said local operating system;
   automatically selecting a set of instructions at said server based upon said index of files prepared by the attribute determination program, wherein the selected set of instructions comprises instructions for providing updated files from said server to said client computer based upon said index and for instructing said client computer to boot said local operating system after said updated files are received from said server; and
   executing the set of selected instructions to thereby update the files on the client computer prior to booting the local operating system on the client computer.

89. The method of claim 88 comprising the step of automatically mounting a volume of said server to said client computer.

90. The method of claim 89 wherein said volume is mounted via a network stack located in a ROM on said client computer.

91. The method of claim 90 wherein said ROM is a ROM on a network interface card of said client computer.

92. The method of claim 91 wherein said ROM is a PXE-enabled ROM.

93. A method of maintaining a registry on a client computer having a local operating system and a network interface card, the method comprising the steps of:
   receiving a boot request at a server computer from said client computer;
   providing an attribute determination program to the client computer via the network interface card in response to said boot request, wherein said attribute determination program is configured to check said registry on said client computer prior to booting said local operating system and to provide a registry response to said server computer via said network interface card;
   receiving said registry response at said server from said attribute determination program;
   automatically selecting a set of instructions at said server based upon said registry response received from the attribute determination program, wherein the selected set of instructions comprises instructions for updating the registry from said server to said client computer in response to said processing step and for instructing said client computer to boot said local operating system after said registry is updated; and
   executing the set of selected instructions to thereby update the registry on the client computer prior to booting the local operating system on the client computer.

* * * * *